(12) United States Patent
Inoue et al.

(10) Patent No.: US 12,466,085 B2
(45) Date of Patent: Nov. 11, 2025

(54) ROBOT OPERATING DEVICE AND ROBOT

(71) Applicant: FANUC CORPORATION, Yamanashi (JP)

(72) Inventors: Toshihiko Inoue, Yamanashi (JP); Tomoyuki Motokado, Yamanashi (JP); Morio Oowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 353 days.

(21) Appl. No.: 18/037,477

(22) PCT Filed: Dec. 21, 2021

(86) PCT No.: PCT/JP2021/047153
§ 371 (c)(1),
(2) Date: May 17, 2023

(87) PCT Pub. No.: WO2022/138596
PCT Pub. Date: Jun. 30, 2022

(65) Prior Publication Data
US 2024/0009858 A1    Jan. 11, 2024

(30) Foreign Application Priority Data

Dec. 25, 2020  (JP) ................................ 2020-216089
Feb. 25, 2021  (JP) ................................ 2021-028278

(51) Int. Cl.
*B25J 13/08*      (2006.01)
(52) U.S. Cl.
CPC .................................. *B25J 13/085* (2013.01)
(58) Field of Classification Search
CPC ..................................................... B25J 13/085
See application file for complete search history.

(56) References Cited

U.S. PATENT DOCUMENTS

| 2009/0259412 A1* | 10/2009 | Brogardh | G05B 19/423 |
| | | | 702/41 |
| 2018/0014893 A1* | 1/2018 | Cleary | A61B 34/20 |
| 2022/0398744 A1* | 12/2022 | Couture | A61B 34/74 |

FOREIGN PATENT DOCUMENTS

| CN | 111300433 A | 6/2020 |
| JP | S58160666 U | 10/1983 |

(Continued)

OTHER PUBLICATIONS

International Search Report and Written Opinion dated Mar. 15, 2022, for International Patent Application No. PCT/JP2021/047153.

*Primary Examiner* — Zoheb S Imtiaz
(74) *Attorney, Agent, or Firm* — KARCESKI IP LAW, PLLC

(57) ABSTRACT

A robot operating device is mounted to a robot. The robot is capable of performing a motion by means of lead-through control in which a force applied by an operator is detected and a position and an orientation are changed in accordance with the detected force and the robot operating device including: a bracket that is secured to a flange at a distal end of the robot and with which an elongated tool is attached at a decentered position with respect to a rotation axis of the flange so as to be parallel to a plane containing the rotation axis; and two handles that are secured to the bracket and that are respectively grasped by two hands of the operator, wherein the handle is disposed in the plane so as to extend in a direction along a longitudinal axis of the tool, and the handle is disposed in a vicinity of the tool so as to extend in a direction intersecting the plane.

20 Claims, 20 Drawing Sheets

(56) References Cited

FOREIGN PATENT DOCUMENTS

| JP | S63278777 A | 11/1988 |
| JP | H01234185 A | 9/1989 |
| JP | H0976183 A | 3/1997 |
| JP | 2001260062 A | 9/2001 |
| JP | 2009078308 A | 4/2009 |
| JP | 2015199174 A | 11/2015 |
| JP | 2017064878 A | 4/2017 |
| JP | 2019034412 A | 3/2019 |

* cited by examiner

ROBOT OPERATING DEVICE AND ROBOT

CROSS-REFERENCE TO RELATED APPLICATION(S)

This is a National Stage Entry into the United States Patent and Trademark Office from International Patent Application No. PCT/JP2021/047153, filed on Dec. 21, 2021, which claims priority to Japanese Patent Application No. 2020-216089, filed on Dec. 25, 2020, and to Japanese Patent Application No. 2021-028278, filed on Feb. 25, 2021, the entire contents of all of which are incorporated herein by reference.

FIELD OF THE INVENTION

The present disclosure relates to a robot operating device and a robot.

BACKGROUND OF THE INVENTION

There is a known robot operating device with which an operator operates a robot by applying a force thereto in order to cause a motion in the robot by means of lead-through control (for example, see Japanese Unexamined Patent Application, Publication No. 2019-34412).

This robot operating device includes two handles that the operator individually grasps with his/her two hands and causes a motion in the robot by means of a resultant force of forces applied to the two handles.

At a flange provided at the most distal end of the robot, a tool such as a hand portion is secured along a rotation axis of the flange, and the two handles extend on either side of a center plane (a plane extending through the center between two fingers of the hand portion in a direction orthogonal to an opening/closing direction of the fingers) of the hand portion. Accordingly, the operator standing in front of the hand portion can individually grasp the two handles with his/her two hands.

SUMMARY OF THE INVENTION

An aspect of the present disclosure is directed to a robot operating device mounted to a robot, the robot being capable of performing a motion by means of lead-through control in which a force applied by an operator is detected and a position and an orientation are changed in accordance with the detected force and the robot operating device comprising: a bracket that is secured to a flange at a distal end of the robot and with which an elongated tool is attached at a decentered position with respect to a rotation axis of the flange so as to be parallel to a plane containing the rotation axis; and two handles that are secured to the bracket and that are respectively grasped by two hands of the operator, wherein one of the handles is disposed in the plane so as to extend in a direction along a longitudinal axis of the tool, and the other handle is disposed in a vicinity of the tool so as to extend in a direction intersecting the plane.

DESCRIPTION OF EMBODIMENT(S) OF THE INVENTION

A robot operating device 1 and a robot 100 according to a first embodiment of the present disclosure will be described below with reference to the drawings.

The robot 100 according to this embodiment has a built-in sensor that detects forces applied thereto by an operator and is capable of performing a motion by means of lead-through control with which the position and the orientation of the robot 100 are changed in accordance with the magnitudes and the directions of the forces detected by the sensor.

Figure 1:
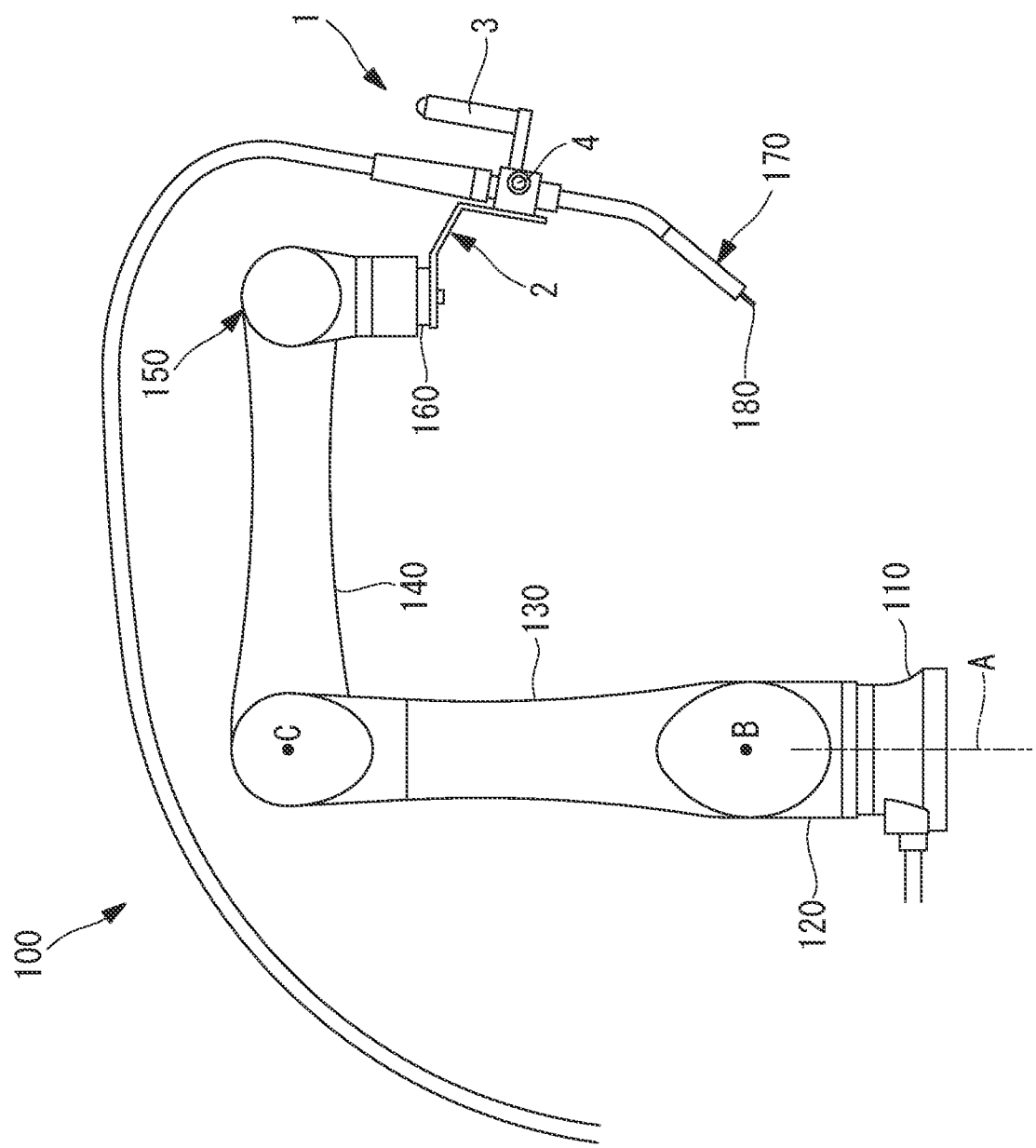
FIG. 1 is a side view showing a robot according to a first embodiment of the present disclosure, the robot having a welding torch mounted to a flange thereof.
Figure 2:
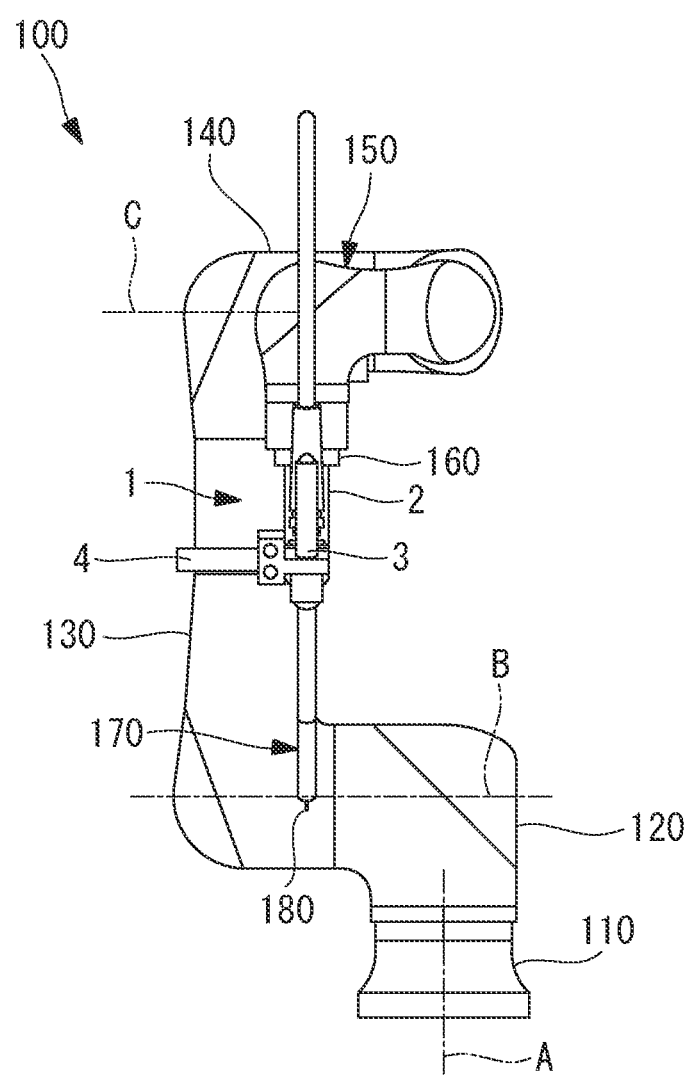
FIG. 2 is a front view showing the robot in FIG. 1.

The robot 100 is, for example, as shown in FIGS. 1 and 2, a vertical six-axis articulated robot and includes: a base 110 that is installed on an installation surface such as a floor surface; and a turning barrel 120 that is supported at the base 110 so as to be rotatable about a first axis A.

In addition, the robot 100 includes: a first arm 130 that is supported at the turning barrel 120 so as to be rotatable about a second axis B; a second arm 140 that is supported at the first arm 130 so as to be rotatable about a third axis C; and a three-axis wrist unit 150 that is supported at a distal end of the second arm 140.

The wrist unit 150 includes a flange 160 that is rotatable about a rotation axis (sixth axis) X at the most distal end thereof. The robot 100 according to this embodiment includes the robot operating device 1 secured to the flange 160.

Figure 3:
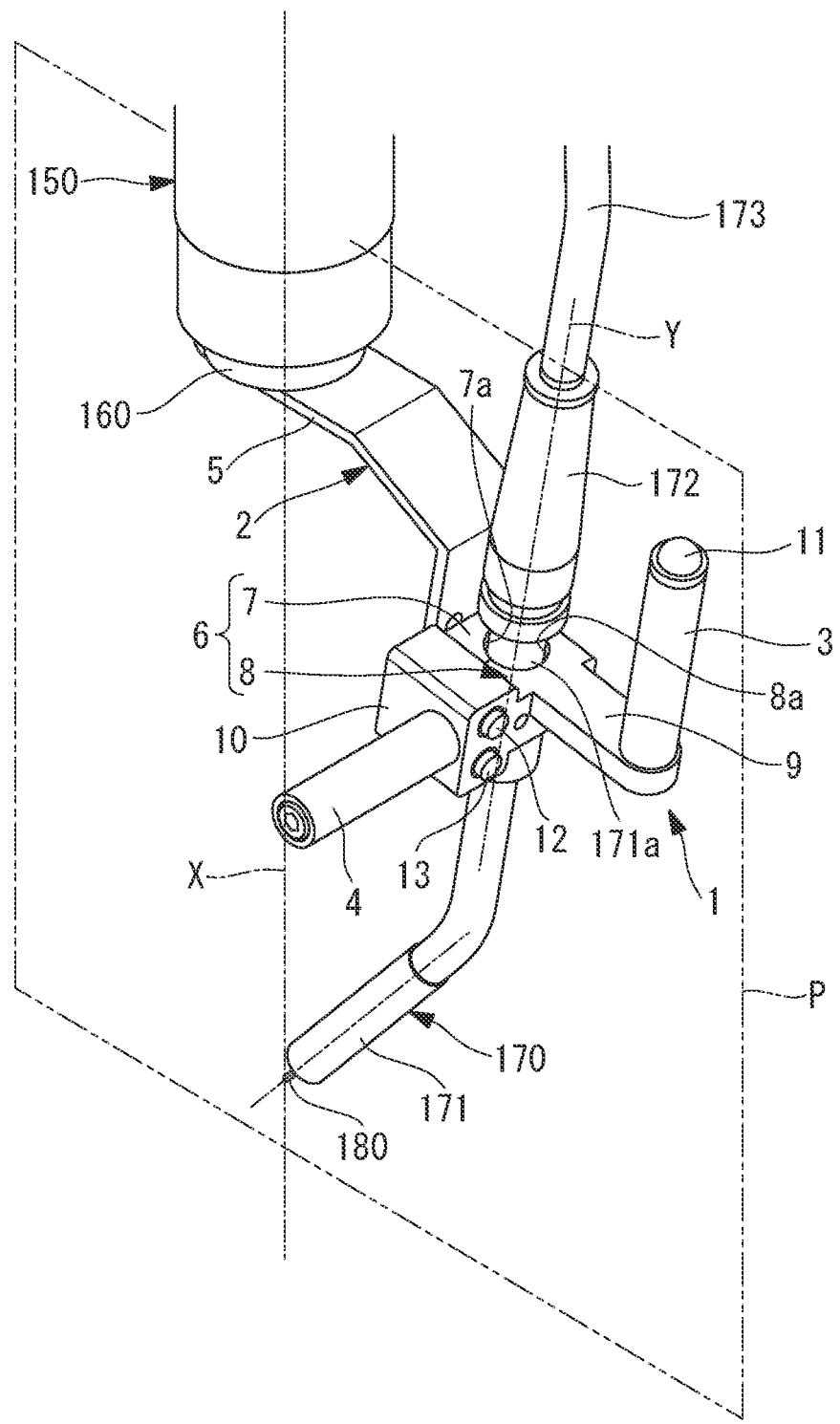
FIG. 3 is a perspective view showing a robot operating device according to the first embodiment of the present disclosure, the device being included in the robot in FIG. 1.

As shown in FIG. 3, the robot operating device 1 according to this embodiment includes a bracket 2 secured to the flange 160 and two handles 3 and 4 secured to the bracket 2.

The bracket 2 is, for example, a member for securing an elongated tool such as a welding torch 170 to the flange 160 and includes a bracket body 5 secured to the flange 160 and a securing block 6 that secures the welding torch 170 to the bracket body 5.

The welding torch 170 includes a tubular torch body 171 that is curved in one direction, a substantially columnar neck holder 172 connected to a proximal end of the torch body 171, and a guide tube 173 connected to a proximal end of the neck holder 172. The guide tube 173, the neck holder 172, and the torch body 171 include inner holes (not shown) that allow a welding wire 180 to pass therethrough in a longitudinal direction. The welding torch 170 welds workpieces by generating an arc between said welding wire and the workpiece by making the welding wire 180 passing through the inner holes protrude from a distal end of the torch body 171.

The securing block 6 includes a pair of half block members 7 and 8 that grasp a cylindrical barrel portion 171*a* of the torch body 171 by sandwiching said portion from radial directions. The half block member 7 or 8 includes a depression 7*a* or 8*a* having a substantially semicircular cross-sectional shape, the depressions 7*a* and 8*a* forming a through-hole having a substantially circular cross-sectional shape that can extend through the barrel portion 171*a* when the two members are combined. The barrel portion 171*a* of the torch body 171 is disposed between the depressions 7*a* and 8*a* of the pair of half block members 7 and 8, and said members are fastened by means of bolts (not shown) together with the bracket body 5, whereby it is possible to secure the barrel portion 171*a* of the torch body 171 to the bracket body 5 in the state in which said portion is sandwiched between the pair of half block members 7 and 8.

Because the welding torch 170 has an elongated form, as described above, the welding torch 170 cannot pass through the interior of the wrist unit 150 and is supported by the bracket 2 at a decentered position with respect to the rotation axis X of the flange 160. Also, the torch body 171 curves along a plane (hereinafter referred to as the tool plane) P that contains the rotation axis X of the flange 160 from the position at which the torch body 171 is secured to the bracket 2 and is disposed so as to make the welding wire 180 protrude at a position intersecting the rotation axis X of the flange 160. The intersection between the rotation axis X of the flange 160 and the welding wire 180 is generally set as a tool distal-end point.

The half block member 8 is provided with two handle securing portions 9 and 10 for securing the two handles 3 and 4.

There are only two handles 3 and 4, namely, the first handle (one handle) 3 that is disposed along the tool plane P and the second handle (other handle) 4 that is disposed at a position close to a longitudinal axis Y of the welding torch 170, serving as a tool, so as to extend in a direction orthogonal to the tool plane P.

The first handle 3 is a straight rod-like member that the operator can grasp with his/her right hand. The handle securing portion 9 extends along the tool plane P in a cantilever shape in a direction away from the rotation axis X of the flange 160. The first handle 3 is secured to a distal end of the handle securing portion 9 and is disposed so as to be parallel to the longitudinal axis Y of the welding torch 170 with a gap that is large enough to place the four fingers other than the thumb of the right hand between the welding torch 170 and the first handle 3. Accordingly, the first handle 3 is disposed in the tool plane P so as to extend along the longitudinal axis Y of the welding torch 170.

A distal end of the first handle 3 is provided with a lead-through switch 11 that can be operated by the thumb of the right hand in the state of grasping the first handle 3.

The lead-through switch 11 functions such that the lead-through control is activated in a state in which a pressing force is applied thereto by the thumb and the lead-through control is deactivated in a state in which the pressing force is released.

The second handle 4 is a straight rod-like member that is disposed at a position at which the operator grasping the first handle 3 with his/her right hand can grasp the second handle 4 with his/her left hand. The handle securing portion (attaching portion) 10 is provided with two push-button switches (operation switches) 12 and 13 at positions at which said switches can be operated with the thumb of the left hand in a state in which the second handle 4 is grasped in an overhand grasp.

The push-button switch 12 is a teaching button (an operation switch, a position teaching switch) that stores, by being pressed, the angles of the respective axes of the robot 100 at the time at which the switch is pressed. In addition, the push-button switch 13 is a mode switch button (an operation switch, a motion-mode changing switch) that switches, each time the switch is pressed, the motion mode of the robot 100 between the orthogonal motion and the respective axial motions.

The operation of the thus-configured robot operating device 1 and robot 100 according to this embodiment will be described below.

In order to perform teaching by employing the robot operating device 1 according to this embodiment while lead-through control of the robot 100 is performed, an operator grasps the first handle 3 with his/her right hand, grasps the second handle 4 with his/her left hand, and presses down the lead-through switch 11 provided on the first handle 3.

Because the lead-through control is activated by doing so, the forces that the operator applies to the first handle 3 and the second handle 4 are detected by the sensor built into the robot 100 and the robot 100 performs a motion at the position and in the orientation in accordance with the detected forces. Then, as a result of the operator pressing down the teaching button 12 provided on the handle securing portion 10 of the second handle 4 at the desired position, the angles of the respective axes of the robot 100 at the time at which the button is pressed down are stored. By repeating this motion, it is possible to teach a motion program for the robot 100.

In this case, with the robot operating device 1 and the robot 100 according to this embodiment, the first handle 3 grasped by the right hand is disposed along the tool plane P in which the rotation axis X of the flange 160 and the torch body 171 are disposed. Accordingly, because the first handle 3 does not protrude from the tool plane P by a large amount, it is possible to reduce the possibility of interference between a peripheral member and the first handle 3.

In addition, as a result of disposing the first handle 3 in the vicinity of the barrel portion 171*a* of the torch body 171 so as to be parallel to the longitudinal axis Y of the barrel portion 171a, the operator grasping the first handle 3 with his/her right hand can move the torch body 171 with a feeling that is equivalent to operating the torch body 171 by directly grasping said torch body. Accordingly, it is easy for the operator to intuitively control the position and the orientation of the torch body 171, and thus, it is possible to precisely position, at a position intended by the operator, a distal end of the welding wire 180 disposed at the tool distal-end point.

In addition, in this embodiment, because the first handle 3 is grasped by the right hand and the second handle 4 is grasped by the left hand, it is possible to make it even easier to control the position and the orientation of the welding torch 170 in the case in which the dominant hand is the right hand.

Because the second handle 4 extends and protrudes only on one side of the tool plane P and does not protrude on both sides of the tool plane P, it is possible to suppress the possibility of interference with the peripheral member to a sufficiently low level. Because the second handle 4 is disposed at a position in the proximity of the longitudinal axis Y of the torch body 171, the operator can directly transmit the force applied to the second handle 4 to the torch body 171, which enables an intuitive operation thereof by the operator.

As a result of providing the second handle 4, there is an advantage in that, in an operation that is difficult to perform only with the first handle 3, for example, a motion for rotating the welding torch 170 about the longitudinal axis of the first handle 3, it is possible to easily perform the operation by utilizing the force applied to the second handle 4 in assistance therefor.

In addition, the teaching button 12 and the motion-mode switch button 13 are disposed on the handle securing portion 10 with which the second handle 4 is attached to the bracket 2. Accordingly, the operator can operate the teaching button 12 and the motion-mode switch button 13 with the thumb of his/her left hand in a state in which the second handle 4 is grasped by the left hand.

Note that, in this embodiment, the teaching button 12 and the motion-mode switch button 13 are provided on the handle securing portion 10 that secures the second handle 4. In addition, the teaching button 12 or the motion-mode switch button 13 may be configured so that a short pressing operation makes said button perform the function as the teaching button 12 or the motion-mode switch button 13 and so that the function thereof can be changed, by means of, for example, a long pressing operation, to a tool-motion teaching switch for teaching a tool-motion instruction.

Accordingly, there is an advantage in that it is possible to easily teach an arc generation start instruction or end instruction in the case in which the tool is the welding torch 170 or to teach an open/close instruction in the case in which the tool is a hand. In addition, as a result of equipping the teaching button 12 or the motion-mode switch button 13 with multiple functions, it is possible to reduce the number of switches that the operator operates and to enhance the ease of use.

In this case, the teaching button 12 or the motion-mode switch button 13 may include an LED lamp (notification function) that issues a state notification by being turned on or off. With the LED lamp being turned on or off, the operator can easily visually recognize the current state of the teaching button 12 or the motion-mode switch button 13.

In addition, in this embodiment, the case in which the first handle 3 is grasped by the right hand and the second handle 4 is grasped by the left hand has been described. Alternatively, by making the second handle 4 protrude to the opposite side from the direction indicated in FIG. 3 with respect to the tool plane P, the first handle 3 may be operated by being grasped by the left hand and the second handle 4 may be operated by being grasped by the right hand. Accordingly, it is possible to easily manipulate the position and the orientation of the welding torch 170 in the case in which the dominant hand is the left hand.

Figure 4:
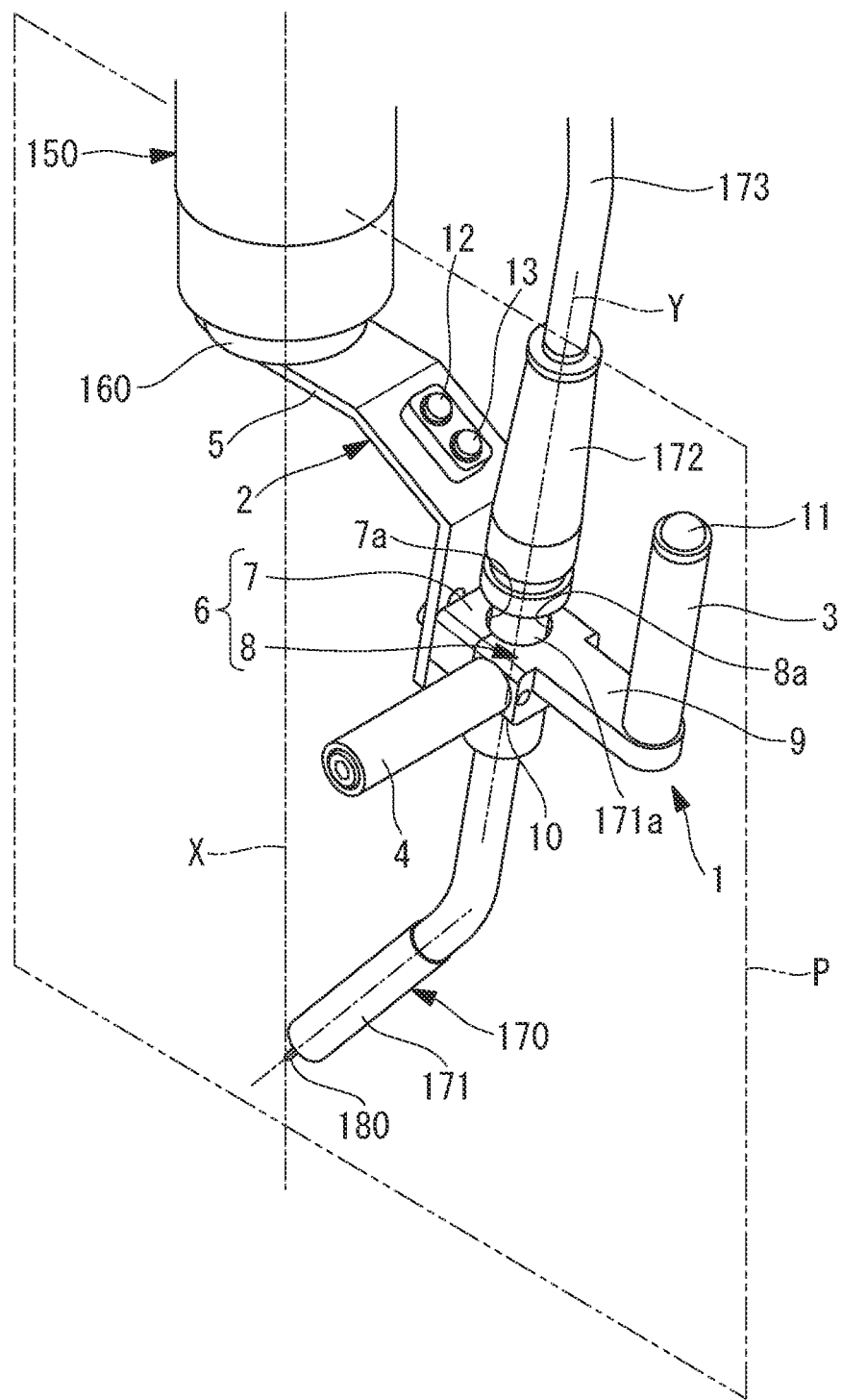
FIG. 4 is a perspective view showing a robot operating device according to a first modification.
Figure 5:
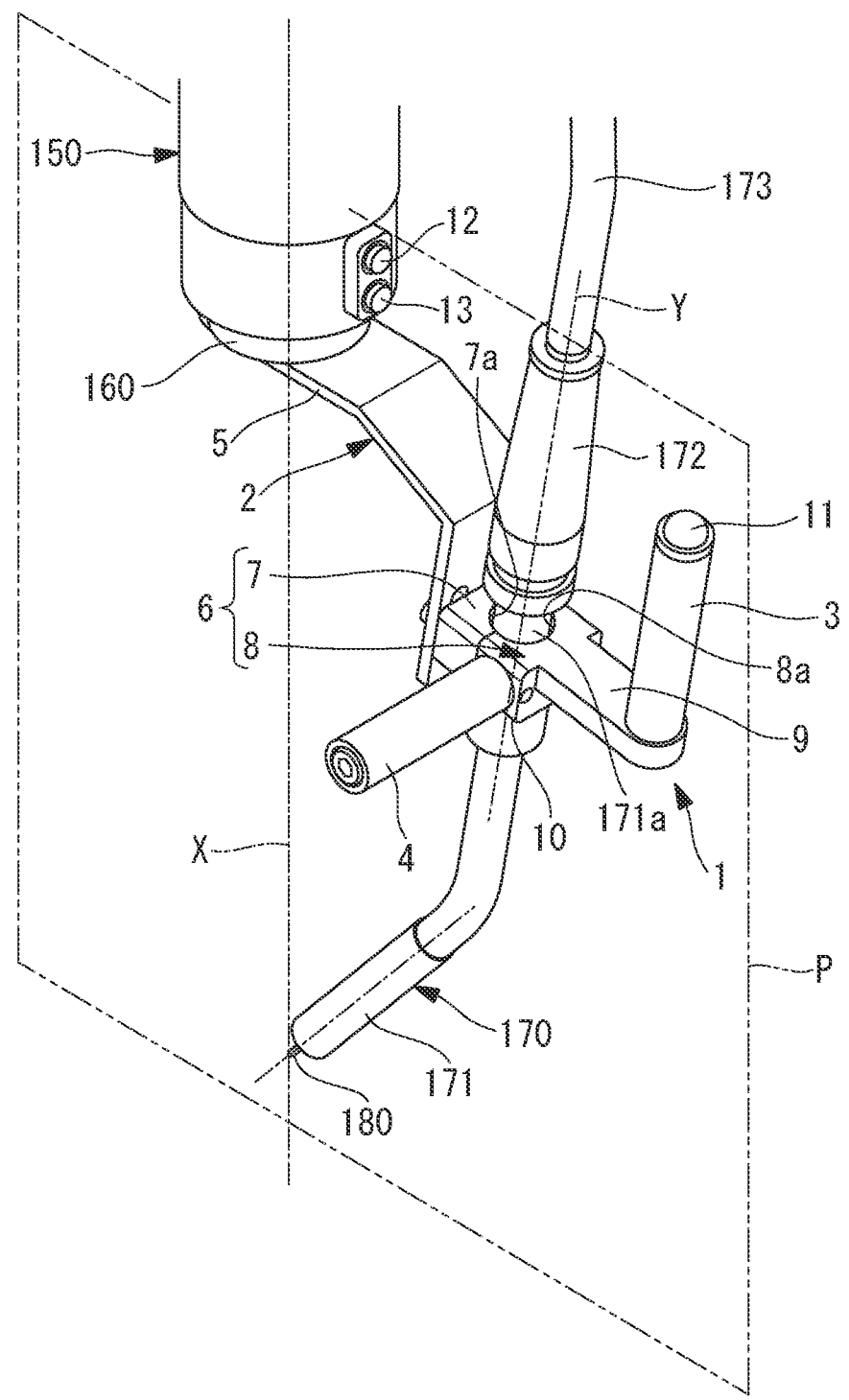
FIG. 5 is a perspective view showing a robot operating device according to a second modification.

In addition, instead of providing the teaching button 12 and the motion-mode switch button 13 on the handle securing portion 10 that secures the second handle 4, said buttons may be provided on the bracket body 5, as shown in FIG. 4, or on the wrist unit 150, as shown in FIG. 5. Accordingly, it is possible to dispose the teaching button 12 and the motion-mode switch button 13 at the positions at which the operator in the state of grasping the first handle 3 with the right hand can operate said buttons with the left hand (the hand that grasps the other handle 4) that has released the second handle 4.

Figure 6:
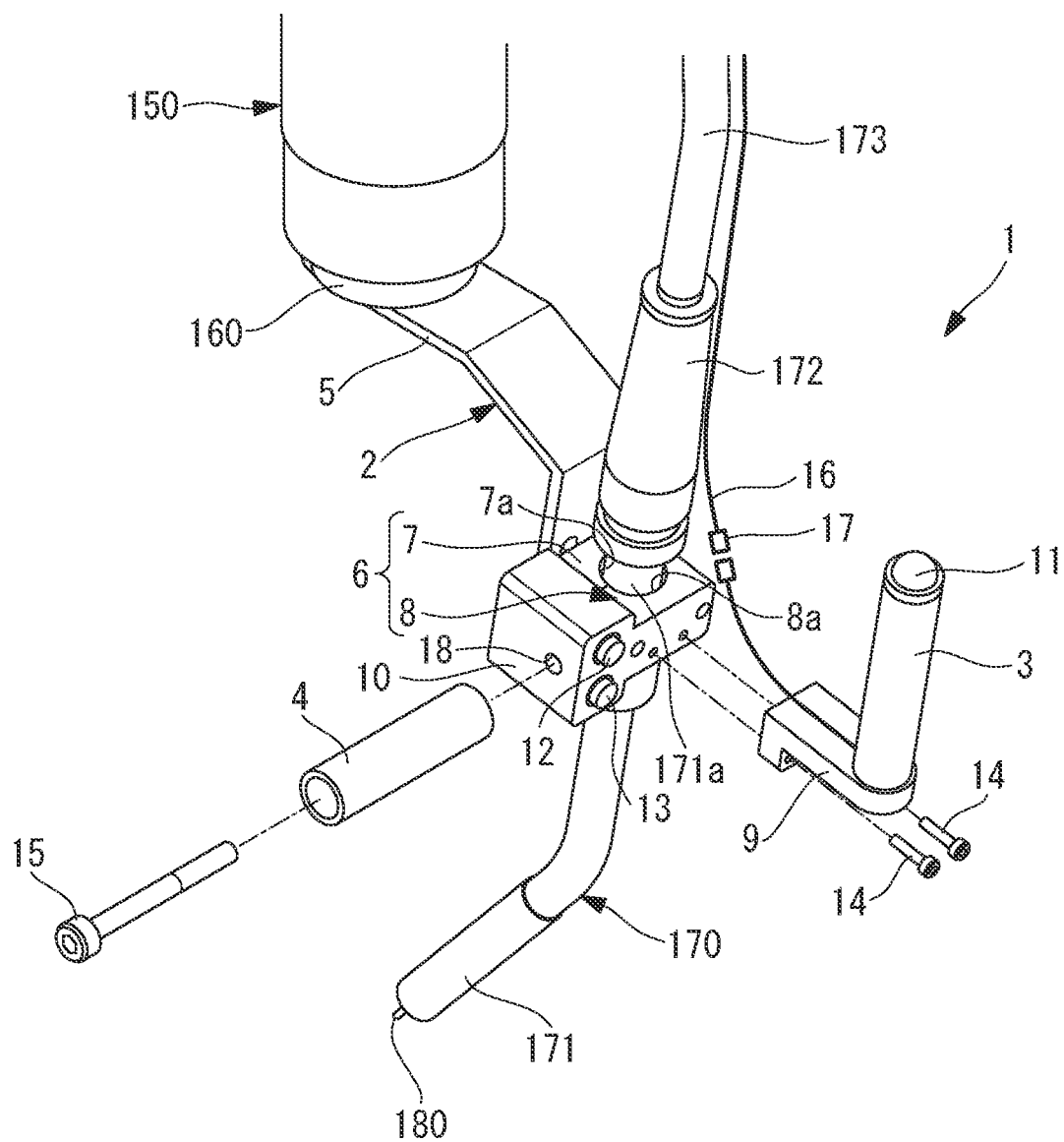
FIG. 6 is a perspective view showing a robot operating device according to a third modification.

In addition, in this embodiment, the first handle 3 and the second handle 4 may be provided so as to be attachable/detachable with respect to the bracket 2. For example, in the example shown in FIG. 6, the first handle 3 is attachable/detachable, together with the handle securing portion 9, with respect to the half block member 8 by means of bolts 14. In addition, the second handle 4 is attachable/detachable with respect to the handle securing portion 10 by means of a bolt 15.

By removing the first handle 3 and the second handle 4 from the bracket 2 after completing the teaching operation by means of the lead-through control, there is an advantage in that it is possible to considerably reduce interference with a peripheral member when executing the taught motion program.

By providing a relay connector 17 in a cable 16 that is connected to the lead-through switch 11 provided on the first handle 3, it is possible to facilitate attaching/detaching of the first handle 3.

In addition, in the case in which the second handle 4 is attached to the handle securing portion 10 in an attachable/detachable manner in the robot operating device 1 shown in FIGS. 4 and 5, the handle securing portion 10 may be provided with a screw hole (see FIG. 6) 18 that makes it possible to alternatively attach the second handle 4 on two sides sandwiching the tool plane P therebetween.

Figure 7:
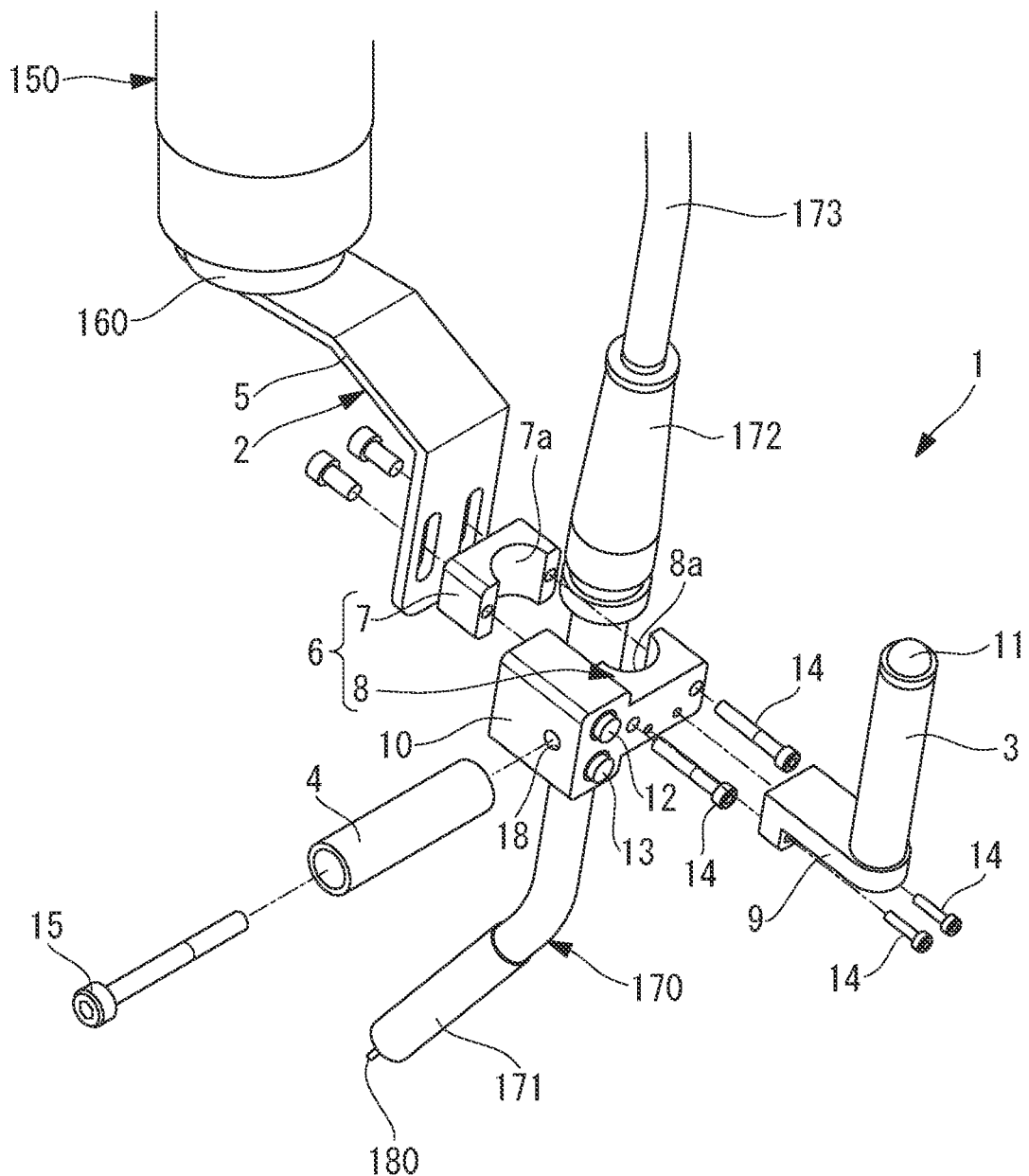
FIG. 7 is an exploded perspective view showing the robot operating device in FIG. 6.
Figure 8:
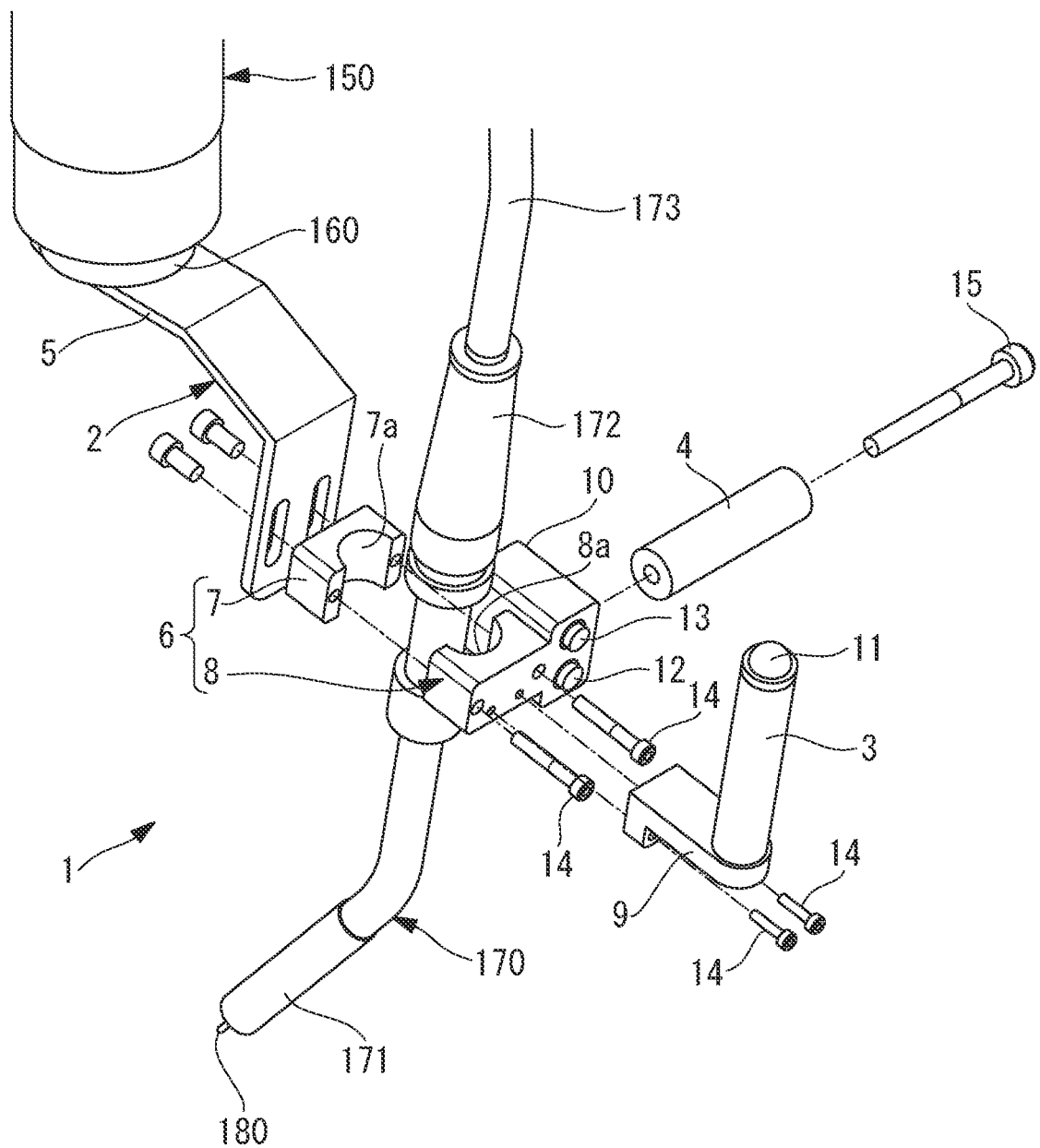
FIG. 8 is an exploded perspective view showing a state in which the robot operating device in FIG. 7 is changed for left-handed use.

In addition, as shown in FIG. 7, the first handle 3 may be removed from the half block member 8 together with the handle securing portion 9, and, as shown in FIG. 8, the first handle 3 and the handle securing portion 9 may be secured to the inverted half block member 8. Accordingly, it is possible to achieve a shared use without having to provide components for each dominant hand.

Specifically, because the first handle 3 is disposed in the tool plane P, it is not necessary to change the position of the first handle 3 to cope with operators having different dominant hands. Therefore, it is possible to utilize the robot operating device 1 as a device for operators having different dominant hands simply by changing the position of the second handle 4 without having to prepare separate components.

In this case, by attaching/detaching cables (not shown) connected to the teaching button 12 and the motion-mode switch button 13 provided on the half block member 8 to/from connectors (not shown) provided in the wrist unit 150, it is possible to facilitate attaching/detaching of the half block member 8.

Figure 9:
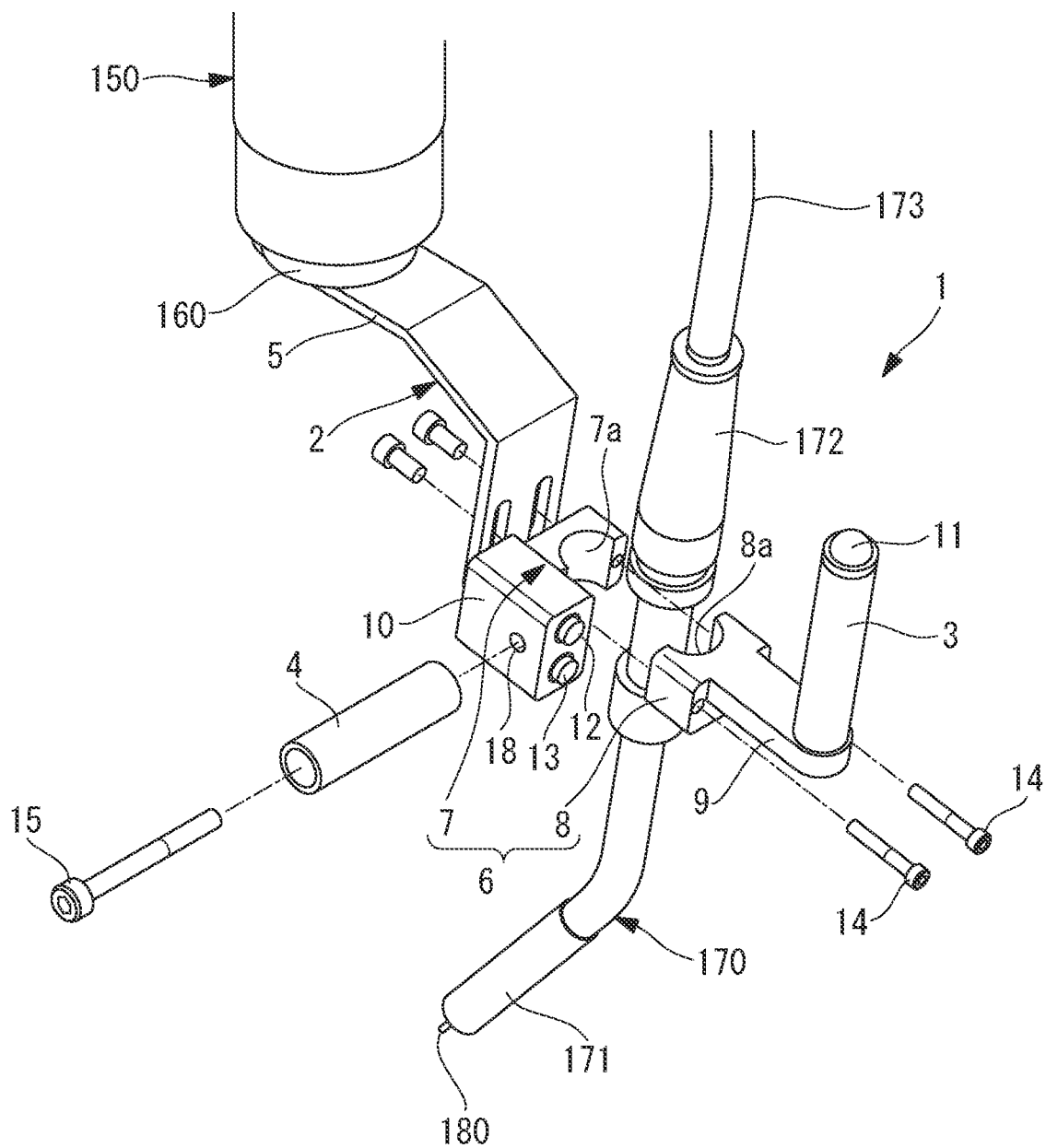
FIG. 9 is an exploded perspective view showing a robot operating device according to a fourth modification.
Figure 10:
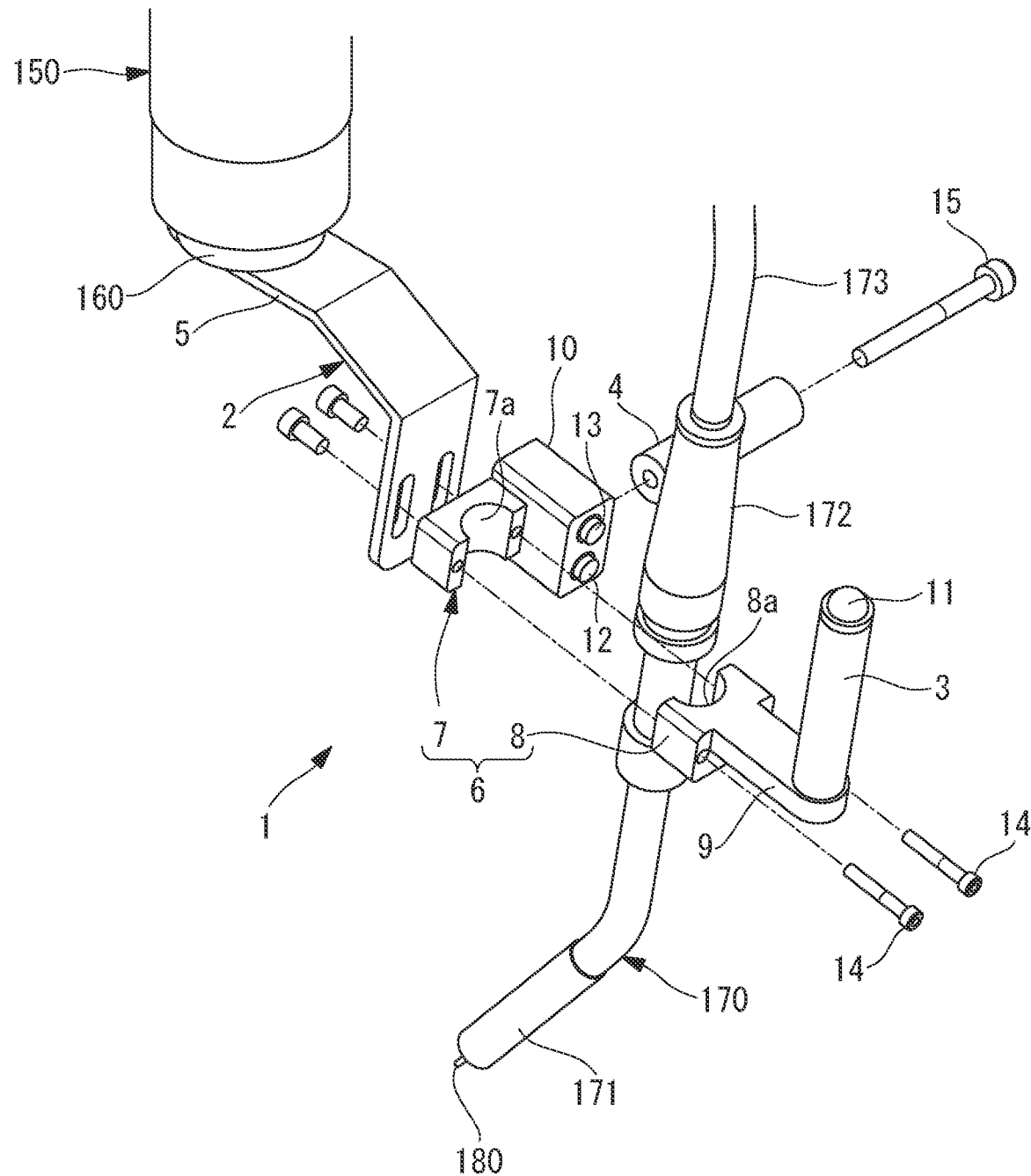
FIG. 10 is an exploded perspective view showing a state in which the robot operating device in FIG. 9 is changed for left-handed use.

In addition, although the case in which the teaching button 12 or the like is disposed on the half block member 8 that secures the first handle 3 has been described as an example, alternatively, as shown in FIG. 9, the handle securing portion 10, the teaching button 12, etc. may be disposed on the half block member 7 secured to the bracket body 5. Accordingly, while it is made possible to invert the position of the second handle 4, as shown in FIG. 10, in accordance with the cases in which the dominant hand is different, it is possible to integrate the handle securing portion 9 with the half block member 8 that secures the first handle 3, and thus, it is possible to reduce the number of components.

Figure 11:
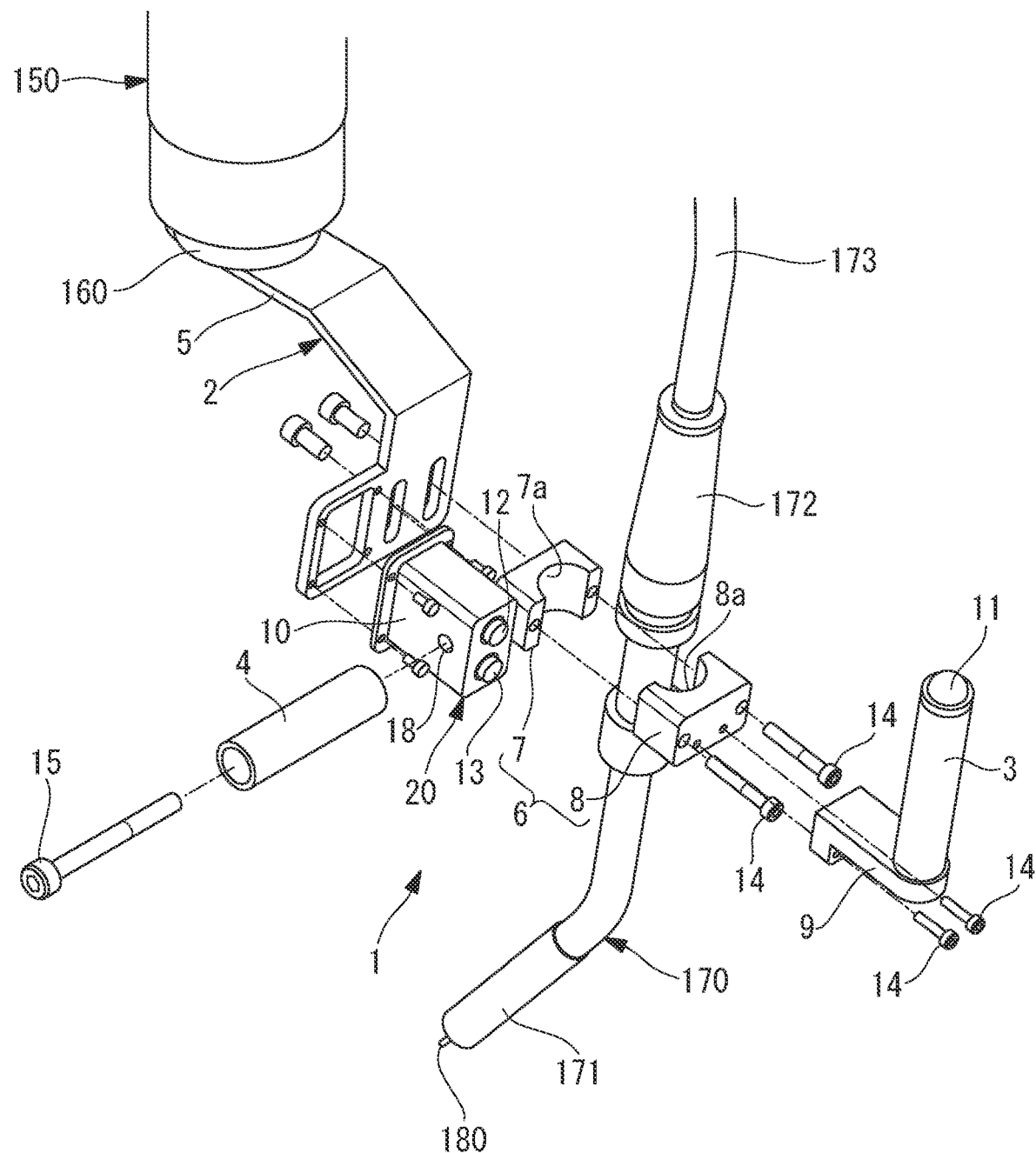
FIG. 11 is an exploded perspective view showing a robot operating device according to a fifth modification.

In addition, as shown in FIG. 11, a switch box 20 provided with the handle securing portion 10, the teaching button 12, etc. may be secured to the bracket body 5 separately from the half block members 7 and 8.

In addition, in this embodiment, although the welding torch 170 has been described as an example of the tool that is secured to the flange 160 by means of the bracket 2, alternatively, another arbitrary tool may be employed so long as the tool is an elongated tool that is disposed at a position offset with respect to the rotation axis X of the flange 160. For example, a laser welding or laser machining nozzle in which an optical fiber cable guiding laser light is connected to a proximal-end side thereof and that emits the laser light from a distal end thereof may be employed.

In addition, a tool in which a motive power cable is connected to a proximal-end side thereof and that performs machining of a workpiece with an instrument disposed at a distal end thereof may be employed. In addition, a nozzle in which a fluid tube is connected to a proximal-end side thereof and that ejects a fluid from a distal end thereof may be employed.

Figure 12:
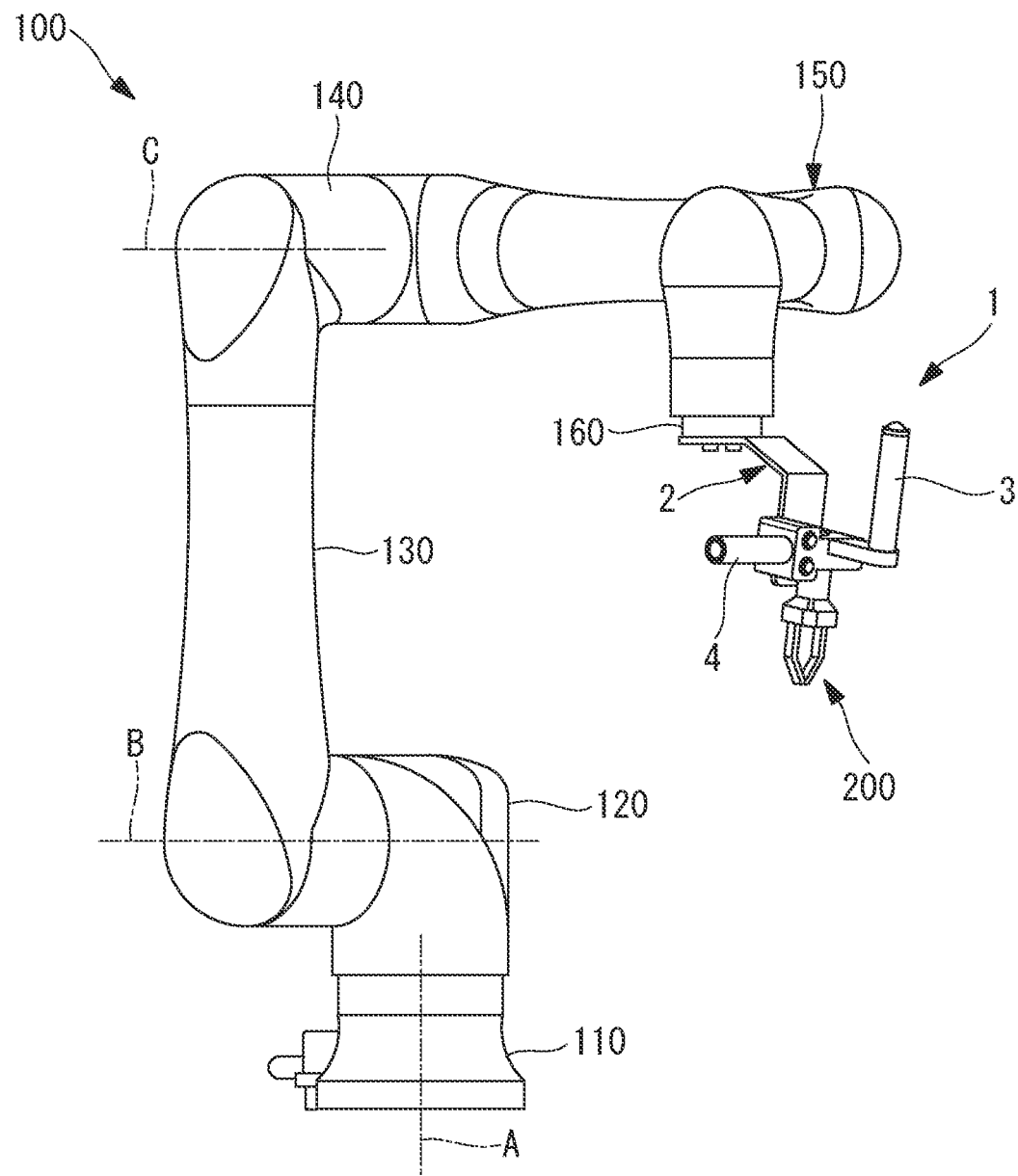
FIG. 12 is a perspective view showing a robot to which a hand is mounted as a tool.

In addition, as shown in FIG. 12, a hand 200 may be employed, the hand 200 opening/closing fingers disposed at a distal end thereof by means of power supplied thereto by a motive power cable connected to a proximal-end side or a pressurized fluid supplied thereto by a fluid tube.

In addition, in this embodiment, the case in which the first handle 3 and the second handle 4 are secured to the securing block 6 that secures the welding torch 170 to the bracket body 5 has been described as an example. Alternatively, by securing the first handle 3 and the second handle 4 to the welding torch 170 that is secured to the bracket body 5 by means of the securing block 6, the first handle 3 and the second handle 4 may be secured indirectly to the bracket 2 via the welding torch 170.

In addition, as shown in FIG. 4 or 5, in the case in which the teaching button 12 and the motion-mode switch button 13 are disposed at different positions from the securing block 6, the second handle 4 may be configured so that the position thereof can be changed. In this case, screw holes (not shown) to which the bolt 15 that secures the second handle 4 can be fastened may be provided on two sides of the securing block 6 sandwiching the tool plane P therebetween. Accordingly, it is possible to dispose the handles 3 and 4 in a manner compatible with both the right-handedness and the left-handedness simply by changing the position of the second handle 4 in the state in which the welding torch 170 is secured to the bracket 2.

Next, a robot operating device 300 and a robot 100 according to a second embodiment of the present disclosure will be described with reference to the drawings.

In describing this embodiment, the same reference signs will be given to the portions that are the same as the configurations of the robot operating device 1 and the robot 100 according to the above-described first embodiment, and the descriptions thereof will be omitted.

Figure 13:
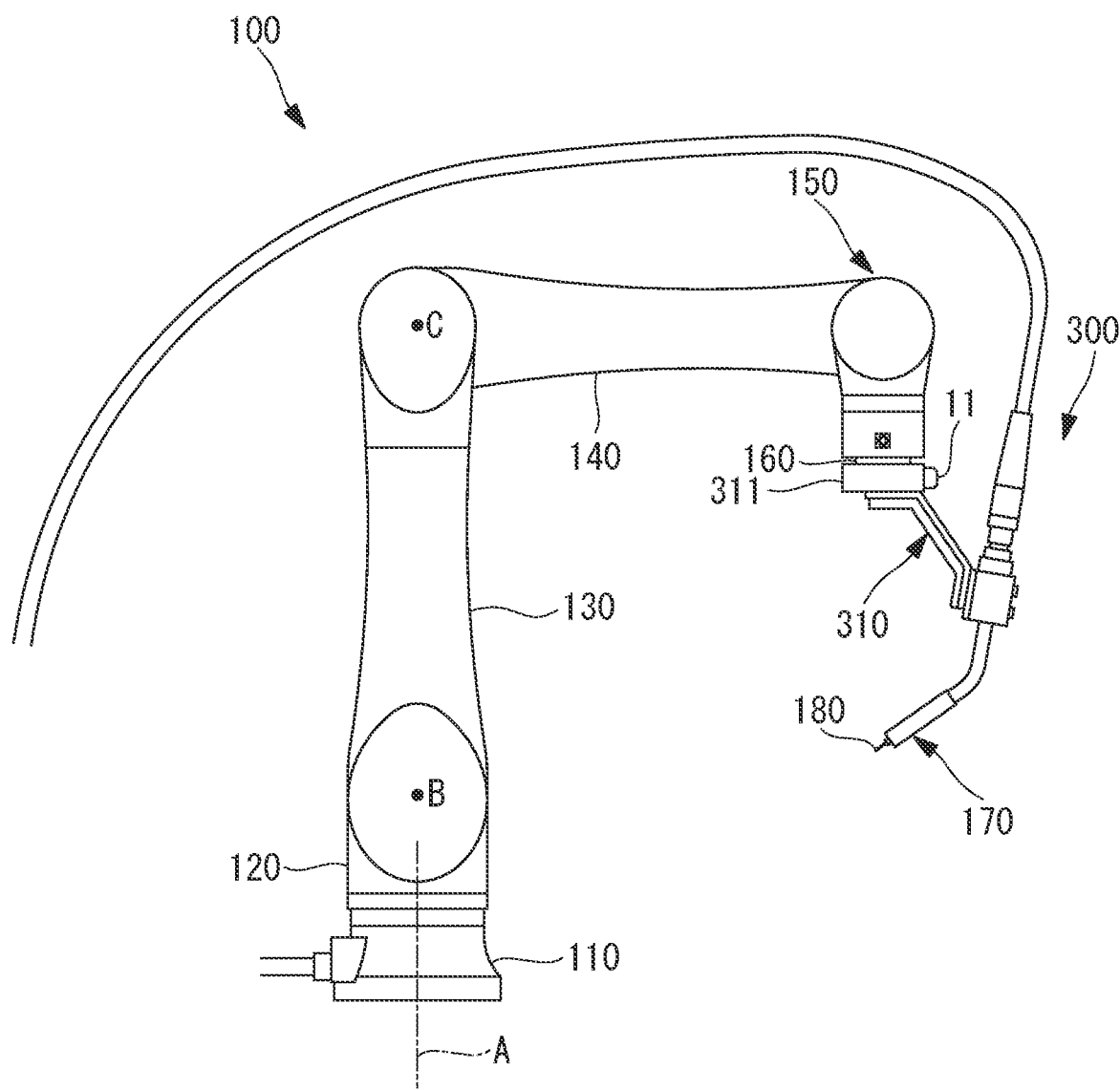
FIG. 13 is a side view showing a robot according to a second embodiment of the present disclosure, the robot having a welding torch mounted to a flange thereof.
Figure 14:
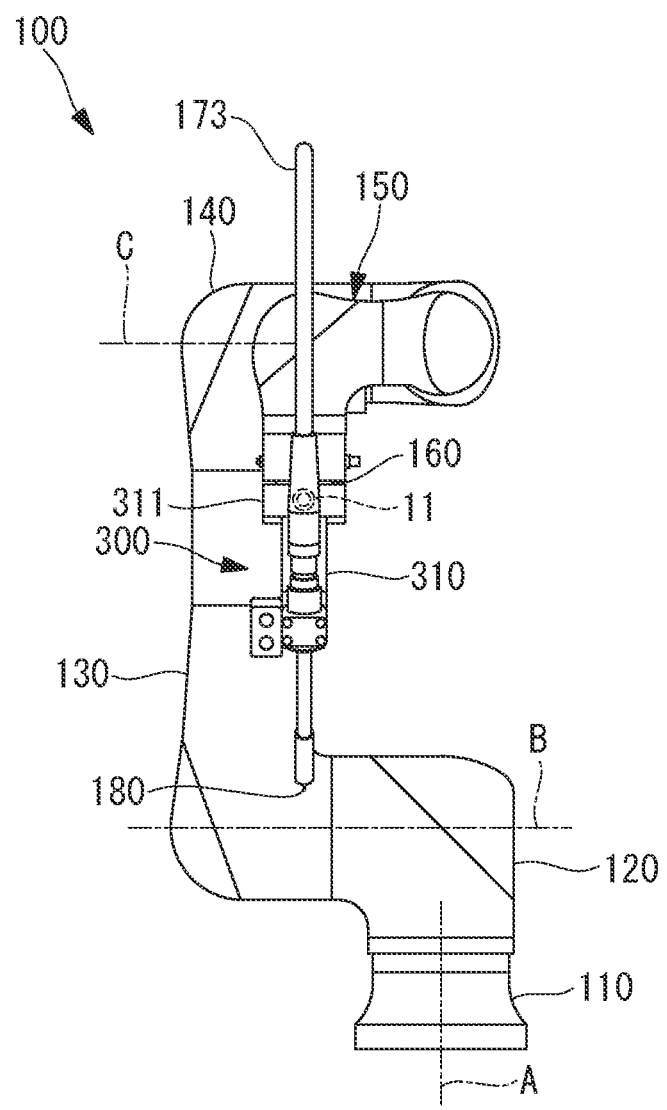
FIG. 14 is a front view showing the robot in FIG. 13.

As shown in FIGS. 13 and 14, the robot 100 according to this embodiment includes a robot operating device 300 secured to the flange 160.

Figure 15:
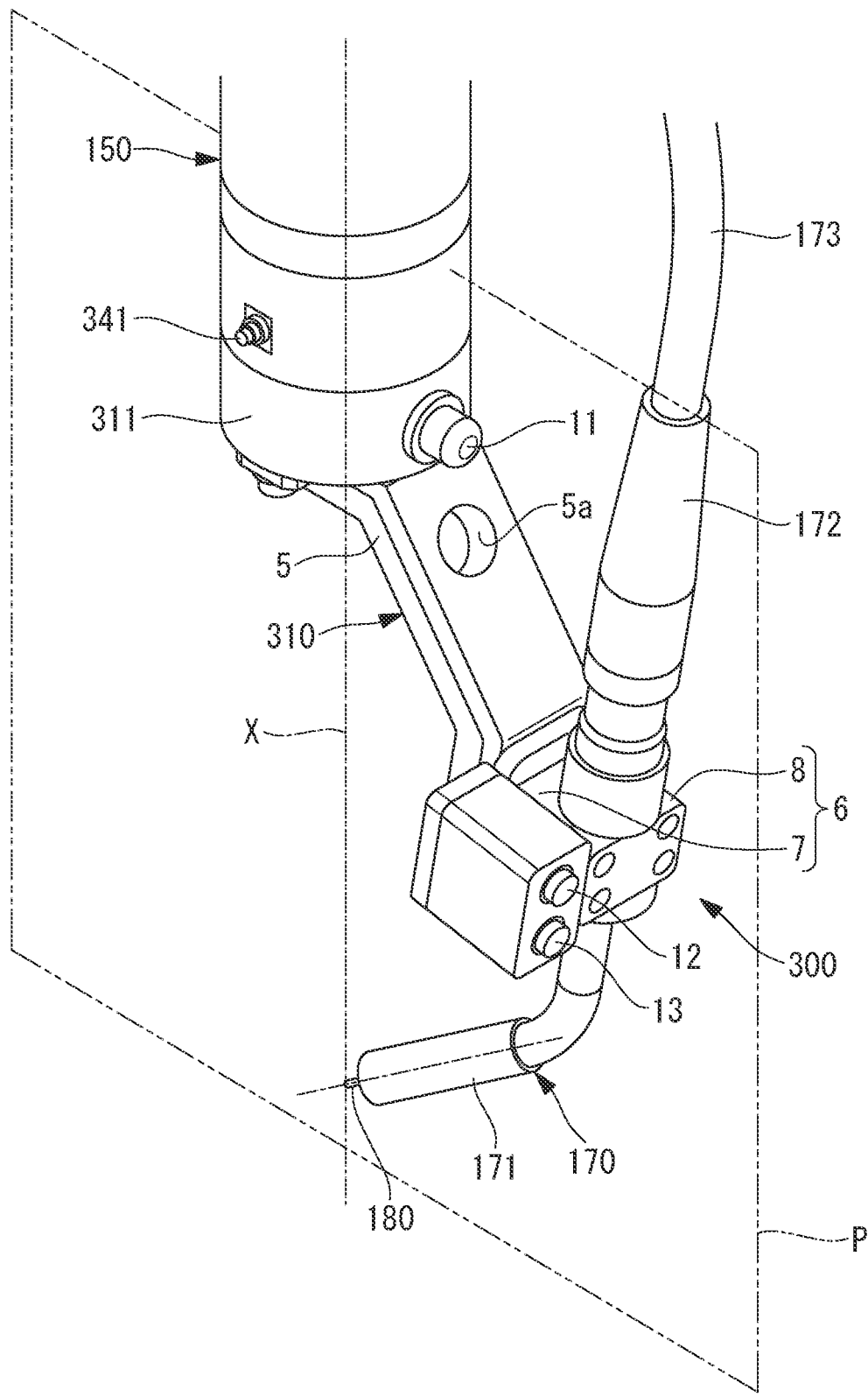
FIG. 15 is a perspective view showing a robot operating device according to the second embodiment of the present disclosure, the device being included in the robot in FIG. 13.

As shown in FIG. 15, the robot operating device 300 according to this embodiment includes a bracket 310 secured to the flange 160.

The bracket 310 is, for example, a member that secures an elongated tool, such as the welding torch 170, to the flange 160. The bracket 310 includes: the bracket body 5; an adaptor (first handle portion) 311 that secures the bracket body 5 to the flange 160; and the securing block (second handle portion) 6 that secures the welding torch 170 to the bracket body 5.

Figure 16:
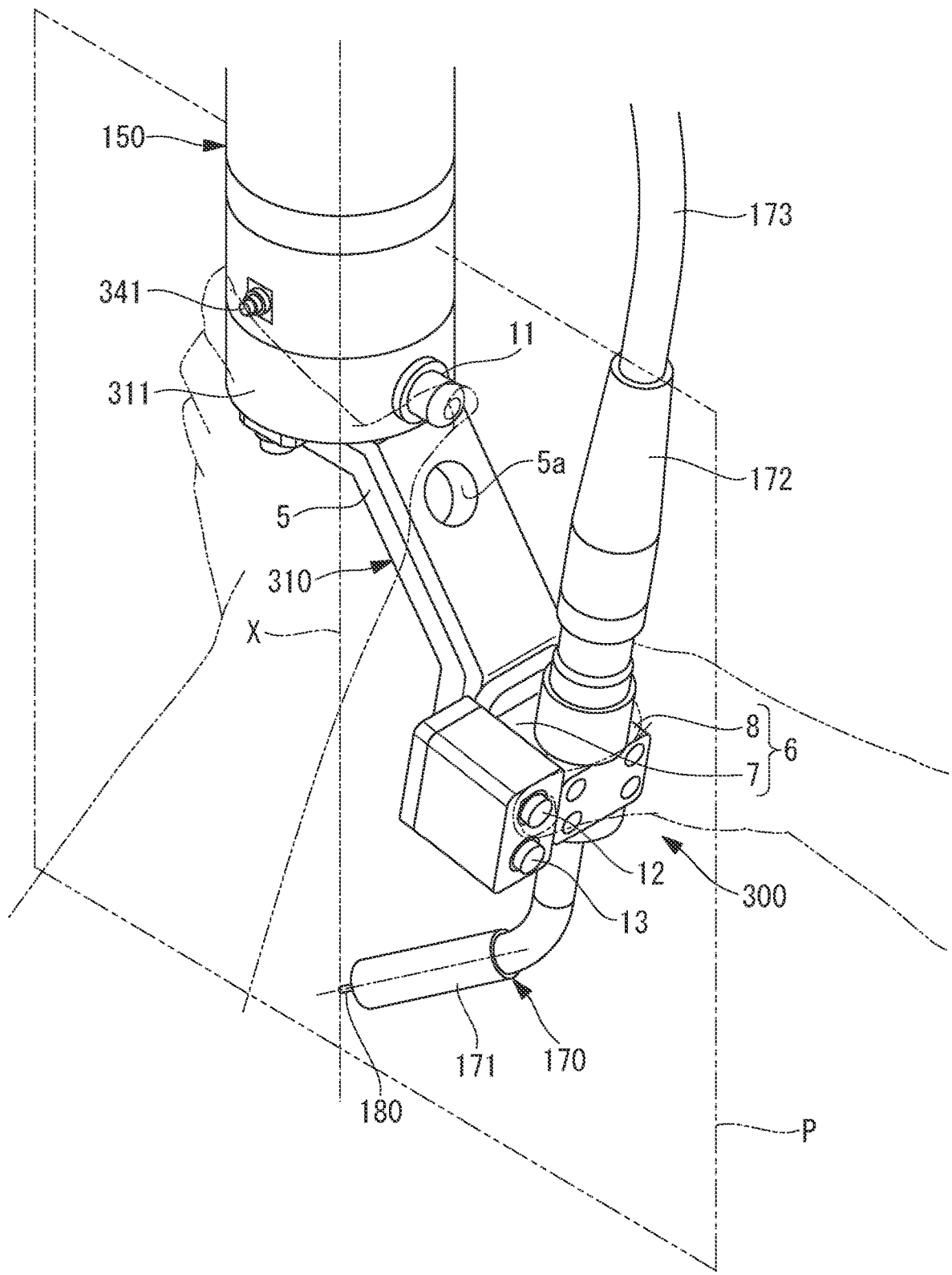
FIG. 16 is a perspective view showing the robot operating device in FIG. 15 together with the hand of an operator grasping the device.

The adaptor 311 is a columnar member that is coaxially disposed with respect to the rotation axis X of the flange 160. As shown in FIG. 16, the adaptor 311 has outer dimensions such that the operator can grasp the adaptor 311 with one of his/her hands (the left hand in this case) so as to surround an outer circumferential surface over an area greater than a half the circumference and apply forces to the flange 160 in various directions. The outer circumferential surface of the adaptor 311 is provided with, at a position on the torch body 171 side in the tool plane P, the lead-through switch 11 that can be operated with the thumb of the left hand in the state of grasping the adaptor 311.

Figure 17:
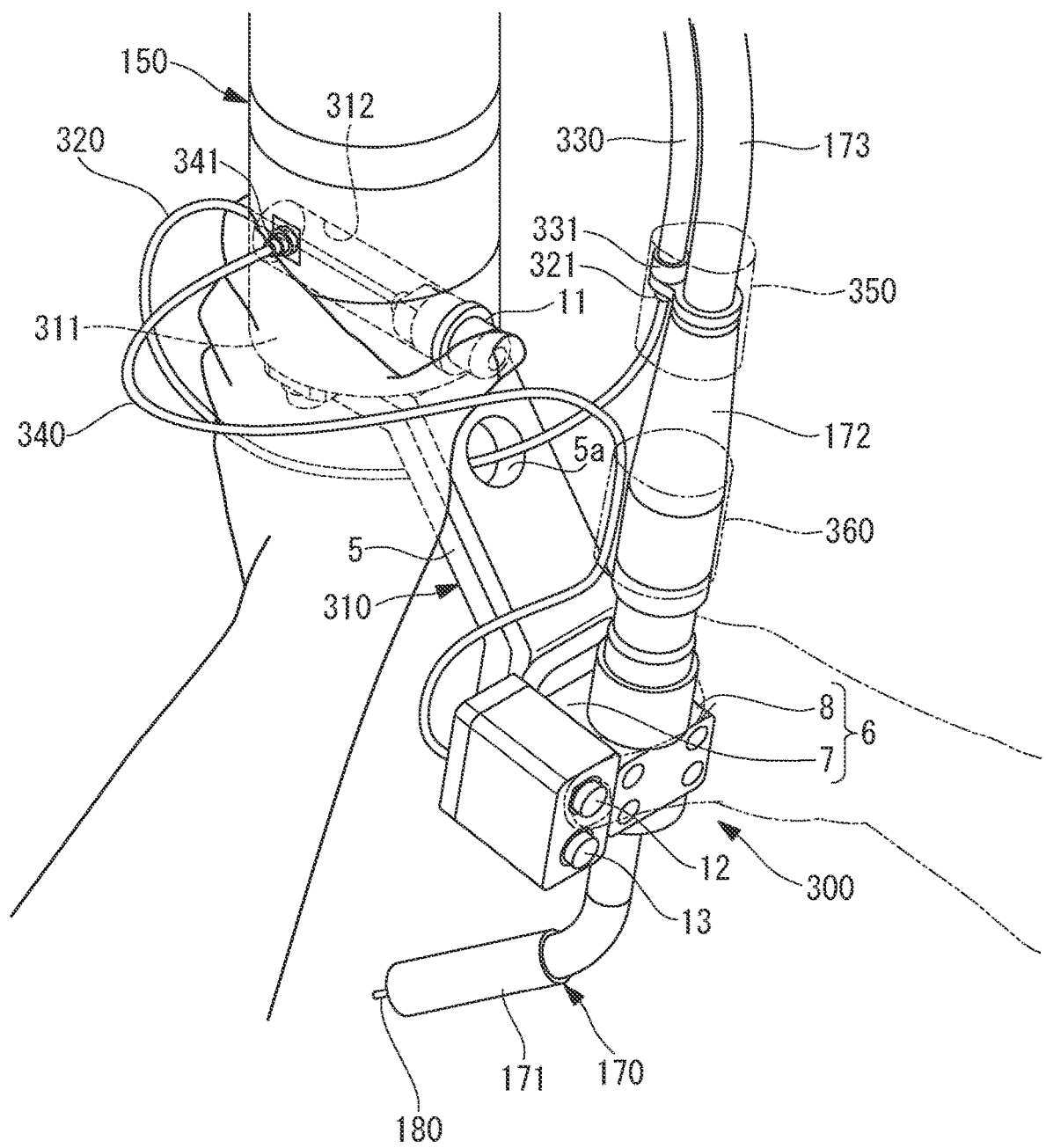
FIG. 17 is a perspective view showing wiring routes of a first cable and a second cable in the robot operating device in FIG. 15.

The lead-through switch 11 is a push-button switch and a first cable 320 is connected thereto. A connector (first connector) 321 is connected to an end portion of the first cable 320. As shown in FIG. 17, a body cable 330 connected to a controller (not shown) is provided along an outer surface of the guide tube 173 so as to reach the vicinity of the neck holder 172 from the controller, and includes a relay connector 331 to which the connector 321 of the first cable 320 can be connected.

The adaptor 311 is provided with a through-hole (passage portion) 312 that extends therethrough in a diameter direction, and a female screw (not shown) is formed in the vicinity of an opening on one end of the through-hole 312. The lead-through switch 11 includes a male screw (not shown), and, by fastening the male screw to the female screw of the through-hole 312, said switch is secured to the adaptor 311 in a state in which the button portion to be operated is exposed to the exterior.

In addition, the bracket body 5 is provided with a through-hole 5a that extends therethrough in a direction along the tool plane P and through which the first cable 320 can pass.

The first cable 320 connected to the lead-through switch 11 passes through the through-hole 312 of the adaptor 311, is taken out from an opening positioned on a back surface with respect to the lead-through switch 11, and is curved toward the distal end of the welding torch 170. Then, the first cable 320 passes through the through-hole 5a of the bracket body 5 and is pulled out on the welding torch 170 side.

Accordingly, the connector 321 of the first cable 320 that is pulled out farther toward the welding torch 170 than the bracket body 5 is connected to the connector 331 of the body cable 330 in the vicinity of the neck holder 172. In the figure, reference sign 350 indicates a hook-and-loop fastener that secures, to the welding torch 170, the connectors 321 and 331 of the body cable 330 and the first cable 320 in the connected state.

As in the first embodiment, the securing block 6 secures the barrel portion 171a of the torch body 171 to the bracket body 5 in the state in which said barrel portion is sandwiched between the pair of half block members 7 and 8. The securing block 6 has a size such that the operator can grasp the securing block 6 with the right hand so as to surround the longitudinal axis Y of the torch body 171 and apply forces to the torch body 171 in various directions. The securing block 6 is provided with the two push-button switches 12 and 13. The push-button switches 12 and 13 are disposed at positions at which said switches can be operated with the thumb of the right hand in the state of grasping the securing block 6.

The push-button switch 12 is a teaching button (an operation switch, a position teaching switch) that stores, by being pressed, the angles of the respective axes of the robot 100 at the time at which the switch is pressed. In addition, the push-button switch 13 is a mode switch button (an operation switch, a motion-mode changing switch) that switches, each time the switch is pressed, the motion mode of the robot 100 between the orthogonal motion and the respective axial motions.

A second cable 340 is connected to the push-button switches 12 and 13. A connector (not shown) is attached to an end portion of the second cable 340. A connector connected to a cable (not shown) provided in the interior of the robot 100 is secured to an outer surface of the wrist unit 150 of the robot 100.

A length-direction intermediate position of the second cable 340 connected to the push-button switches 12 and 13 is secured to the neck holder 172 by means of a hook-and-loop fastener 360 at a position extended from the push-button switches 12 and 13 along the neck holder 172 of the welding torch 170. From said position, the second cable 340 crosses a space farther on the flange 160 side than the adaptor 311 and is connected to a connector (second connector) 341 of the wrist unit 150.

As a result of being provided in the above-described manners, the first cable 320 and the second cable 340 are disposed at positions away from the outer circumferential surface of the adaptor 311 and the outer surface of the securing block 6 that are positioned in the regions that are grasped by the operator. Accordingly, when the operator teaches the robot 100 while the lead-through control is performed, it is possible to prevent the first cable 320 and the second cable 340 from interfering with the operation performed by the operator.

The operation of the thus-configured robot operating device 300 and robot 100 according to this embodiment will be described below.

In order to perform teaching by employing the robot operating device 300 according to this embodiment while lead-through control of the robot 100 is performed, an operator grasps the adaptor 311 with his/her left hand, grasps the securing block 6 with his/her right hand, and presses down the lead-through switch 11 provided on the adaptor 311 with the thumb of his/her left hand.

Because the lead-through control is activated by doing so, the forces that the operator applies to the adaptor 311 and the securing block 6 are detected by the sensor built into the robot 100 and the robot 100 performs a motion at the position and in the orientation in accordance with the detected forces. Then, as a result of the operator pressing down the teaching button 12 provided on the securing block 6 at the desired position, the angles of the respective axes of the robot 100 at the time of pressing down the button are stored. By repeating this motion, it is possible to teach a motion program for the robot 100.

In this case, as a result of providing the lead-through switch 11 on the columnar adaptor 311 that is coaxially secured to the flange 160 and that is easy for the operator to grasp, it is possible to apply forces to the robot 100 in a state in which the lead-through control is active by employing the adaptor 311 as the first handle portion. In addition, as a result of providing the operation switches 12 and 13 on the securing block 6 that secures the torch body 171 to the bracket body 5, it is possible to perform teaching or the like while applying forces to the torch body 171 by employing the securing block 6 as the second handle portion.

The first handle portion and the second handle portion that are configured by the adaptor 311 and the securing block 6 do not protrude from the rotation axis X of the flange 160 and the longitudinal axis Y of the welding torch 170 by an amount larger than the first handle 3 and the second handle 4 in the first embodiment. Therefore, it is possible to easily perform teaching by suppressing interference with a peripheral member. In addition, there is an advantage in that it is possible to considerably reduce interference with a peripheral member when executing the taught motion program even if the handles 3 and 4 are not removed after performing the teaching.

In addition, as a result of employing the securing block 6 as the second handle portion, the operator grasping the securing block 6 with his/her right hand can move the torch body 171 with a feeling that is equivalent to operating the torch body 171 by directly grasping said torch body. Accordingly, it is easy for the operator to intuitively control the position and the orientation of the torch body 171, and thus, it is possible to precisely position, at a position intended by the operator, a distal end of the welding wire 180 disposed at the tool distal-end point.

In addition, in this embodiment, because the adaptor 311 is grasped by the left hand and the securing block 6 is grasped by the right hand, it is possible to make it even easier to control the position and the orientation of the welding torch 170 in the case in which the dominant hand is the right hand.

As a result of grasping the securing block 6 in addition to the adaptor 311, there is an advantage in that, in an operation that is difficult to perform only with the adaptor 311, for example, a motion for rotating the welding torch 170 about the rotation axis X of the flange 160, it is possible to easily perform the operation by utilizing the force applied to the adaptor 311 in assistance therefor.

In addition, as a result of disposing the teaching button 12 and the motion-mode switch button 13 on the securing block 6, the operator can operate the teaching button 12 and the motion-mode switch button 13 with the thumb of the right hand in a state in which the securing block 6 is grasped by the right hand.

In addition, the first cable 320 and the second cable 340 are provided so as to be away from, of the outer circumferential surface of the adaptor 311, the region grasped by the operator with his/her left hand and, of the outer surface of the securing block 6, the region grasped by the operator with his/her right hand; therefore, the first cable 320 and the second cable 340 do not interfere with the operation.

Note that, in this embodiment also, the teaching button 12 or the motion-mode switch button 13 may be configured so that a short pressing operation makes said button perform the function as the teaching button 12 or the motion-mode switch button 13 and so that the function thereof can be changed, by means of, for example, a long pressing operation, to a tool-motion teaching switch for teaching a tool-motion instruction.

In addition, in this embodiment, the case in which the adaptor 311 is grasped by the left hand and the securing block 6 is grasped by the right hand has been described.

Alternatively, by attaching the securing block 6 in reverse in left and right, for example, as with FIG. 8, the adaptor 311 may be operated by being grasped by the right hand and the securing block 6 may be operated by being grasped by the left hand. By doing so, it is possible to easily manipulate the position and the orientation of the welding torch 170 in the case in which the dominant hand is the left hand.

In this case, because the lead-through switch 11 is disposed on the outer circumferential surface of the adaptor 311 so as to be in the tool plane, it is possible to perform changes for different dominant hands without having to change the position of the lead-through switch 11. In addition, even if the wiring routes of the first cable 320 and the second cable 340 are kept as described above, the first cable 320 and the second cable 340 do not interfere with the operator. In other words, it is possible to make it easy to perform changes for the cases in which operators having different dominant hands perform the operation.

Figure 18:
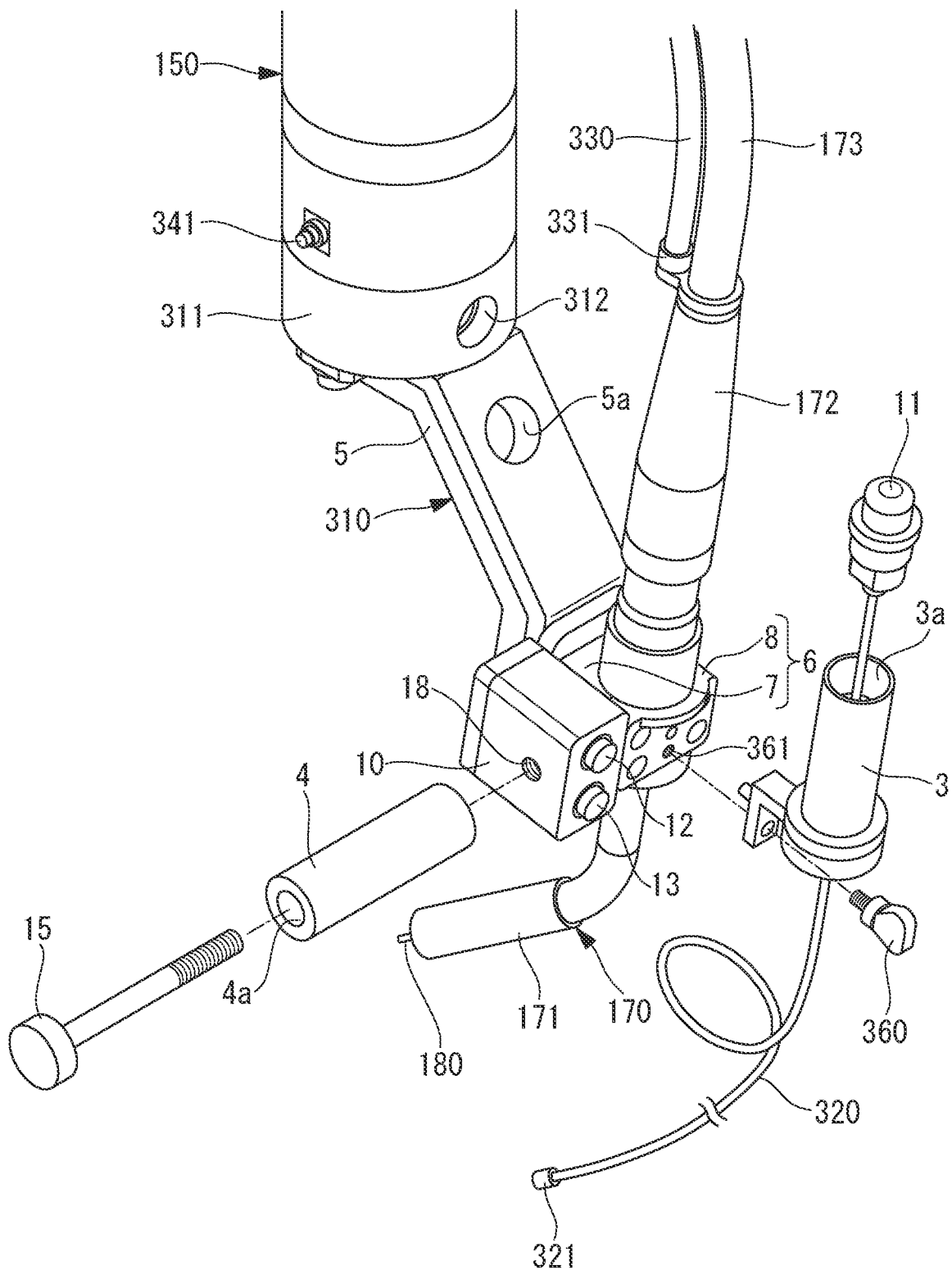
FIG. 18 is an exploded perspective view showing a modification of the robot operating device in FIG. 15.

In addition, as shown in FIG. 18, screw holes 18 and 361 and a pin hole 4*a* may be provided, the screw holes 18 and 361 and the pin hole 41 making it possible to attach/detach the first handle (first attachable/detachable handle) 3 and the second handle (second attachable/detachable handle) 4 that are the same as those in the robot operating device 1 according to the first embodiment to/from the securing block 6 that serves as the second handle portion. In this case, as shown in FIG. 18, the first handle 3 may be configured as a hollow structure having an inner hole 3*a* and a distal-end inner surface thereof may be provided with a female screw (not shown) to which a male screw (not shown) of the lead-through switch 11 can be fastened. In FIG. 18, reference sign 360 indicates a screw for securing the first handle 3 to the securing block 6.

Figure 19:
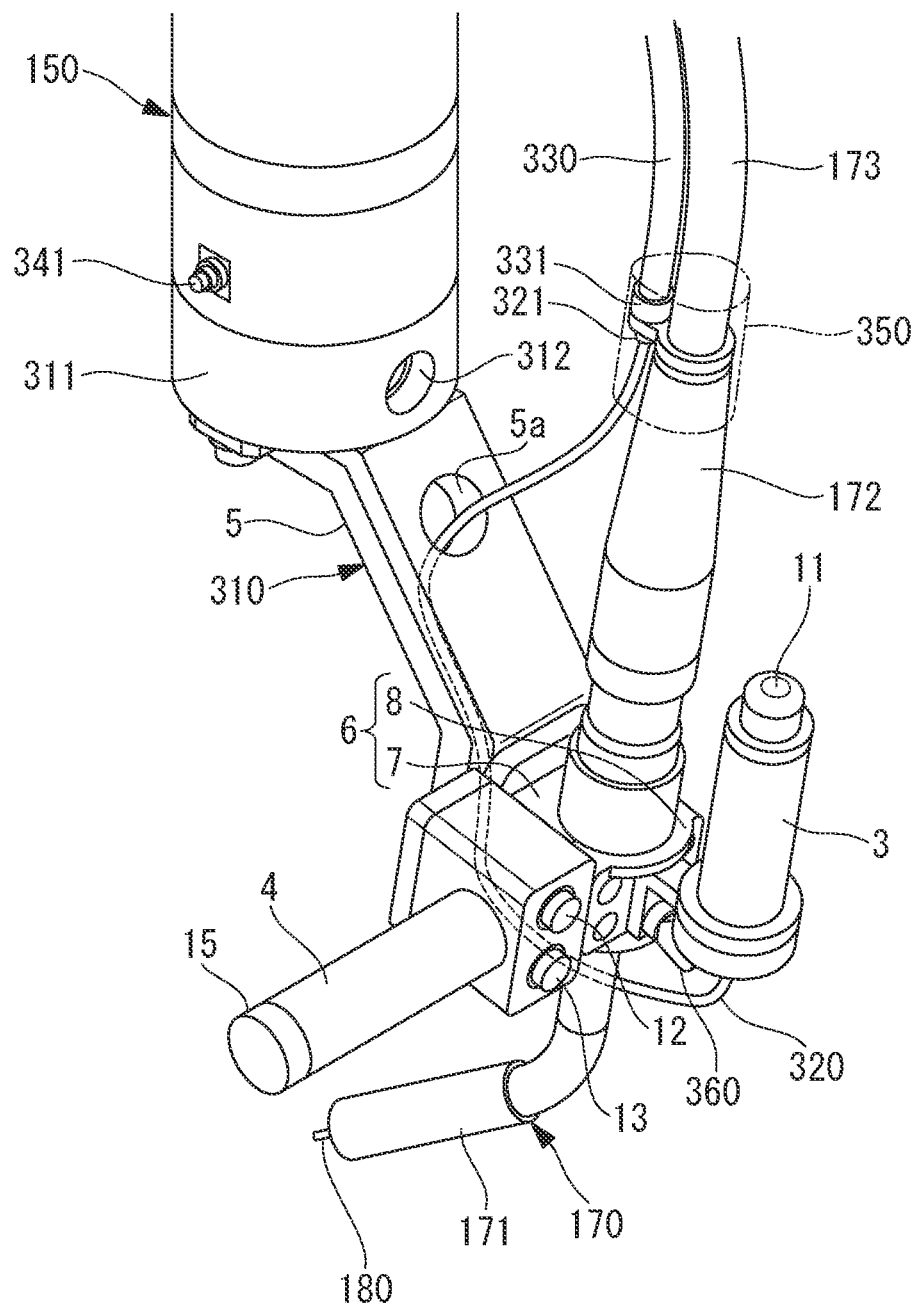
FIG. 19 is a perspective view for explaining procedures for attaching a first handle and a second handle of the robot operating device in FIG. 18.

The case in which the first handle 3 and the second handle 4 are attached as shown in FIG. 19 starting from the state in which the lead-through switch 11 is attached to the adaptor 311 as shown in FIG. 17 will be described. First, from the state shown in FIG. 17, the first cable 320 and the body cable 330 are disconnected, and the lead-through switch 11, the first cable 320, and the connector 321 are removed from the through-hole 312 of the adaptor 311.

Next, as shown in FIG. 18, the first handle 3 and the second handle 4 are secured to the securing block 6, and the connector 321 and the first cable 320 are made to pass through the inner hole 3*a* of the first handle 3. Then, as shown in FIG. 19, the male screw of the lead-through switch 11 is fastened to the female screw, and the connector 321 of the first cable 320 is connected to the connector 331 of the body cable 330. By doing so, it is possible to provide the first cable 320 so as to extend along the outer surface of the first handle 3.

In addition, in this embodiment, the bracket 310 includes the adaptor 311, the bracket body 5, and the securing block 6 that are separate components and that are mounted with respect to each other. Alternatively, the adaptor 311 and the bracket body 5, the bracket body 5 and the half block member 7 of the securing block 6, or the adaptor 311, the bracket body 5 and the half block member 7 may be integrally formed.

Figure 20:
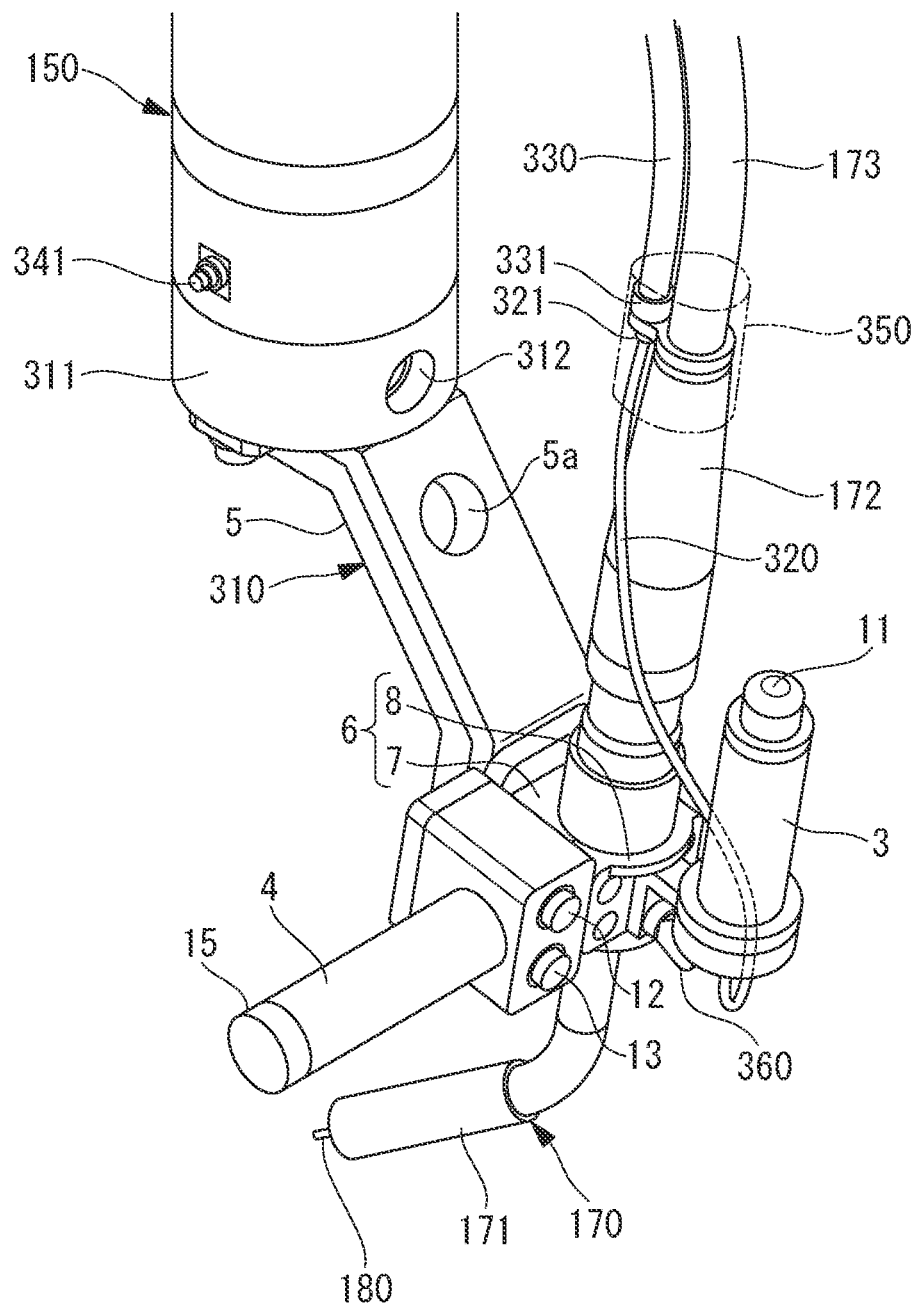
FIG. 20 is a perspective view showing a modification of the robot operating device in FIG. 19.

In addition, as shown in FIG. 20, the first cable 320 may pass through the inner hole 3*a* of the first handle 3 and may subsequently extend along the outer surface of the neck holder 172 so that the connector 321 is connected to the connector 331 of the body cable 330.

Accordingly, it is possible to minimize an external interference area of the first cable 320.

In addition, although the through-hole 312 that extends through the adaptor 311 in the diameter direction is provided in said adaptor so as to serve as a passage portion in which the first cable 320 is disposed, it is not limited thereto. The opening from which the first cable 320 is pulled out may be disposed in an attachment surface to which the bracket body 5 is attached, instead of the outer circumferential surface of the adaptor 311. Accordingly, there is an advantage in that, because the first cable 320 does not pass over the outer circumferential surface of the adaptor 311, said cable does not interfere when the adaptor 311 is grasped.

In addition, instead of configuring the passage portion with the through-hole 312, the passage portion may be configured with a groove that can accommodate the first cable 320.

The invention claimed is:

1. A robot operating device mounted to a robot,
the robot being capable of performing a motion by means of lead-through control in which a force applied by an operator is detected and a position and an orientation are changed in accordance with the detected force,
the robot operating device comprising:
a bracket that is secured to a flange at a distal end of the robot and with which an elongated tool is attached at a decentered position with respect to a rotation axis of the flange so as to be parallel to a plane containing the rotation axis; and
two handles that are secured to the bracket and that are respectively grasped by two hands of the operator, wherein
one of the handles is disposed in the plane so as to extend in a direction along a longitudinal axis of the tool, and
the other handle is disposed in a vicinity of the tool so as to extend in a direction intersecting the plane.

2. The robot operating device according to claim 1, wherein the one of the handles is provided with a lead-through switch that is operated with a hand of the operator in a state in which the one of the handles is grasped and that switches the lead-through control to an active state or an inactive state.

3. The robot operating device according to claim 2, wherein at least one of operation switches, namely, a position teaching switch and a motion-mode changing switch, is disposed within a reach of a hand of the operator grasping the other handle in the state in which the one of the handles is grasped.

4. The robot operating device according to claim 3, wherein the at least one of the operation switches is disposed at a position the at least one of the operation switches can be operated with the hand of the operator in a state of grasping the other handle.

5. The robot operating device according to claim 1, wherein the other handle is secured to the bracket in a removable manner.

6. The robot operating device according to claim 5, wherein attaching portions to which the other handle can be alternatively attached are provided on two sides of the bracket sandwiching the plane therebetween.

7. The robot operating device according to claim 1, wherein the one of the handles is secured to the bracket in a removable manner.

8. A robot operating device mounted to a robot,
the robot being capable of performing a motion by means of lead-through control in which a force applied by an operator is detected and a position and an orientation are changed in accordance with the applied force and the robot operating device comprising a bracket that is secured to a flange at a distal end of the robot and with which an elongated tool is attached at a decentered position with respect to a rotation axis of the flange so as to be parallel to a plane containing the rotation axis, wherein a first handle portion that can be grasped by one of hands of the operator so as to surround the rotation axis is provided in a vicinity of the position at which the bracket is secured to the flange, and a second handle portion that can be grasped by the other hand of the operator so as to surround a longitudinal axis of the tool is provided in a vicinity of the position at which the tool is attached to the bracket, wherein the second handle portion is provided with at least one of operation switches, namely, a position teaching switch and a motion-mode changing switch, that is operated by the other hand in a state of grasping the second handle portion.

9. The robot operating device according to claim 8, wherein the first handle portion is provided with a lead-through switch that is operated with the one of hands in a state in which the first handle portion is grasped and that switches the lead-through control to an active state or an inactive state.

10. The robot operating device according to claim 9, wherein:
the bracket comprises a bracket body for attaching the tool and a columnar adaptor that secures the bracket body to the flange; and
the adaptor constitutes the first handle portion.

11. The robot operating device according to claim 10, further comprising a first cable, one end of which is connected to the lead-through switch,
wherein the first cable and a body cable that is connected to a controller with which the robot is controlled and that is provided along the tool are connected in an attachable/detachable manner by means of a first connector that is attached to the other end of the first cable.

12. The robot operating device according to claim 11, wherein:
an opening to which the lead-through switch is attached is provided in an outer circumferential surface of the adaptor;
the adaptor is provided with a passage portion that is in communication with the opening and that disposes a portion of the first cable in an accommodated state; and
the passage portion makes the first cable on a side of the first connector exposed outward from the adaptor from a position other than a region grasped by the one of hands in an outer surface of the adaptor.

13. The robot operating device according to claim 10, further comprising:
a first attachable/detachable handle that is attached, in an attachable/detachable manner, to the second handle portion so as to extend in the plane along the longitudinal axis of the tool; and
a second attachable/detachable handle that is attached, in an attachable/detachable manner, to the second handle portion so as to extend along a direction intersecting the plane, wherein
the lead-through switch is attached to the adaptor in an attachable/detachable manner, and
the lead-through switch removed from the adaptor can be attached to the first attachable/detachable handle.

14. The robot operating device according to claim 8, further comprising a second cable, one end of which is connected to the operation switch,
wherein the second cable extends along the tool from the operation switch, subsequently passes a portion farther on a side of the flange than the adaptor, and is connected to a second connector provided at a distal end of the robot.

15. The robot operating device according to claim 3, wherein the at least one of the operation switches is capable of changing, by means of a long pressing operation, a function thereof to a tool-motion teaching switch for teaching a tool-motion instruction.

16. The robot operating device according to claim 15, wherein the operation switch includes a notification function for issuing a notification about the function change.

17. The robot comprising a robot operating device according to claim 1.

18. The robot operating device according to claim 14, wherein the at least one of the operation switches is capable of changing, by means of a long pressing operation, a function thereof to a tool-motion teaching switch for teaching a tool-motion instruction.

19. The robot operating device according to claim 18, wherein the operation switch includes a notification function for issuing a notification about the function change.

20. The robot comprising a robot operating device according to claim 8.

* * * * *